(12) United States Patent
Park et al.

(10) Patent No.: US 11,398,855 B2
(45) Date of Patent: Jul. 26, 2022

(54) METHOD BY WHICH BASE STATION TRANSMITS SIGNAL ON BASIS OF ANTENNA ARRAY IN WIRELESS COMMUNICATION SYSTEM, AND APPARATUS THEREFOR

(71) Applicant: LG ELECTRONICS INC., Seoul (KR)

(72) Inventors: Jonghyun Park, Seoul (KR); Wonjae Ryoo, Seoul (KR); Wonjin Sung, Seoul (KR); Haewook Park, Seoul (KR)

(73) Assignees: LG Electronics Inc., Seoul (KR); Sogang University Research Foundation, Seoul (KR)

( * ) Notice: Subject to any disclaimer, the term of this patent is extended or adjusted under 35 U.S.C. 154(b) by 0 days.

(21) Appl. No.: 17/295,991

(22) PCT Filed: Nov. 14, 2019

(86) PCT No.: PCT/KR2019/015511
§ 371 (c)(1),
(2) Date: May 21, 2021

(87) PCT Pub. No.: WO2020/111597
PCT Pub. Date: Jun. 4, 2020

(65) Prior Publication Data
US 2022/0021428 A1    Jan. 20, 2022

(30) Foreign Application Priority Data

Nov. 26, 2018    (KR) .......................... 10-2018-0147153

(51) Int. Cl.
*H04B 7/0456*    (2017.01)
(52) U.S. Cl.
CPC ................................ *H04B 7/0486* (2013.01)
(58) Field of Classification Search
CPC .............................. H04B 7/0486; H04B 7/06
See application file for complete search history.

(56) References Cited

U.S. PATENT DOCUMENTS

2019/0013858 A1\* 1/2019 Kakishima ........... H04B 7/0417
2019/0044589 A1\* 2/2019 Park ..................... H04B 7/0469

FOREIGN PATENT DOCUMENTS

KR    1020090032545    4/2009
KR    1020100058907    6/2010
(Continued)

*Primary Examiner* — Sung S Ahn
(74) *Attorney, Agent, or Firm* — Dentons US LLP

(57) ABSTRACT

A method by which a base station transmits a signal on the basis of an antenna array in a wireless communication system, according to an embodiment of the present invention, comprises the steps of: determining a multi-rank beam in consideration of (i) positions of a plurality of terminals and (ii) positions of null points of a beam generated through the antenna array; and transmitting signals to the plurality of terminals by using the multi-rank beam. The antenna array may be based on a three-dimensional shape having omni-directional symmetry, and the positions of the null points and the positions of the plurality of terminals may be configured on the basis of a polar coordinate system using the center of the antenna array as an origin point.

15 Claims, 34 Drawing Sheets

(a)

(b)

(56) References Cited

FOREIGN PATENT DOCUMENTS

| | | |
|---|---|---|
| KR | 101105012 | 1/2012 |
| WO | 2016195393 | 12/2016 |
| WO | 2017136761 | 8/2017 |

\* cited by examiner

[FIG. 1]
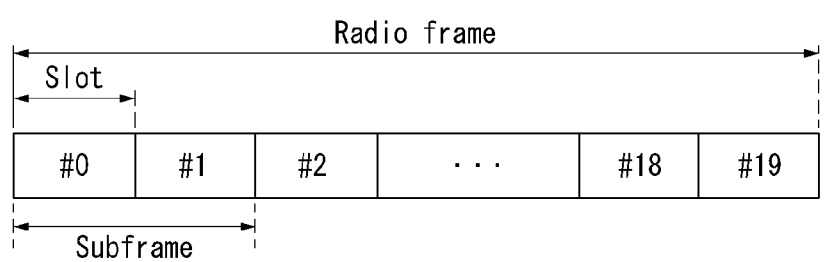

[FIG. 2]
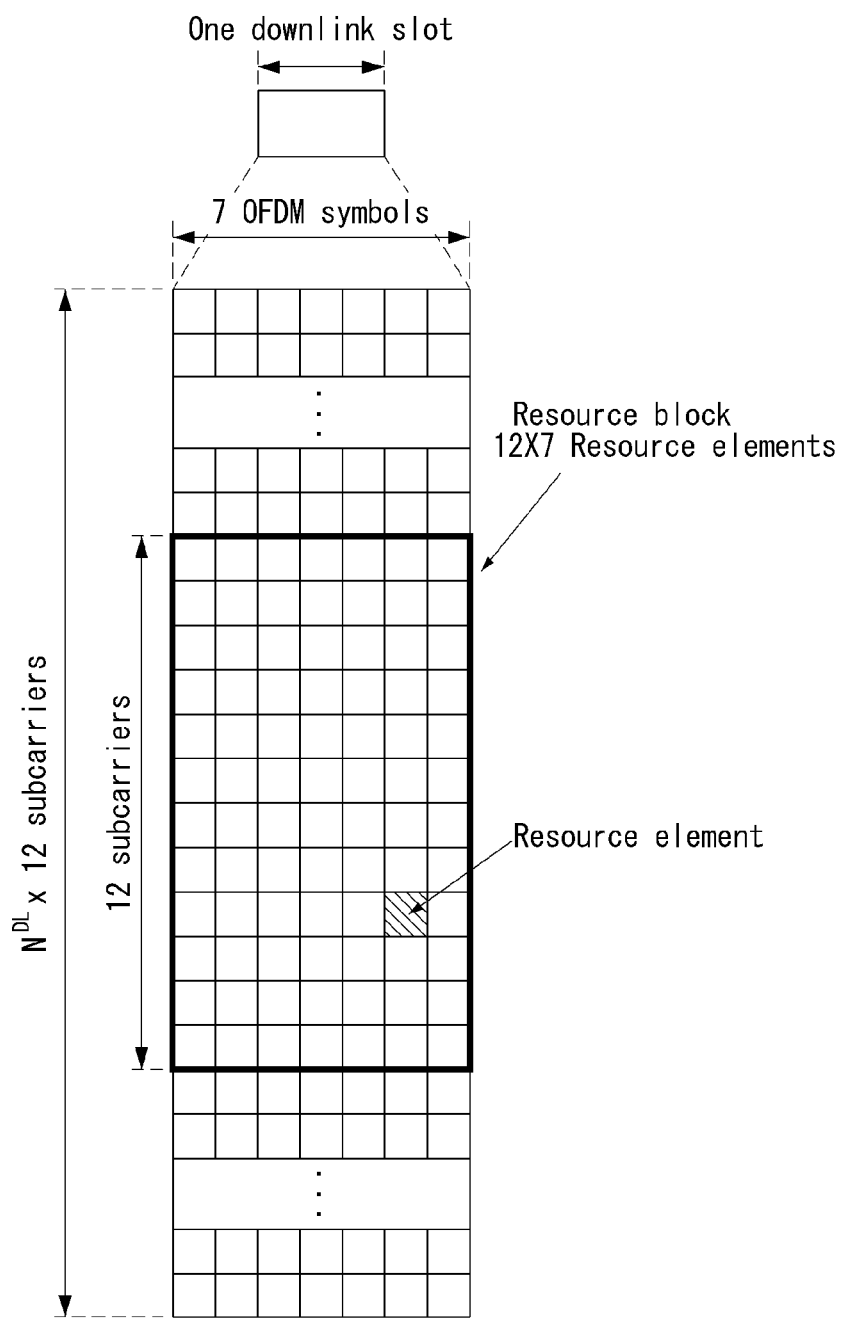

[FIG. 3]
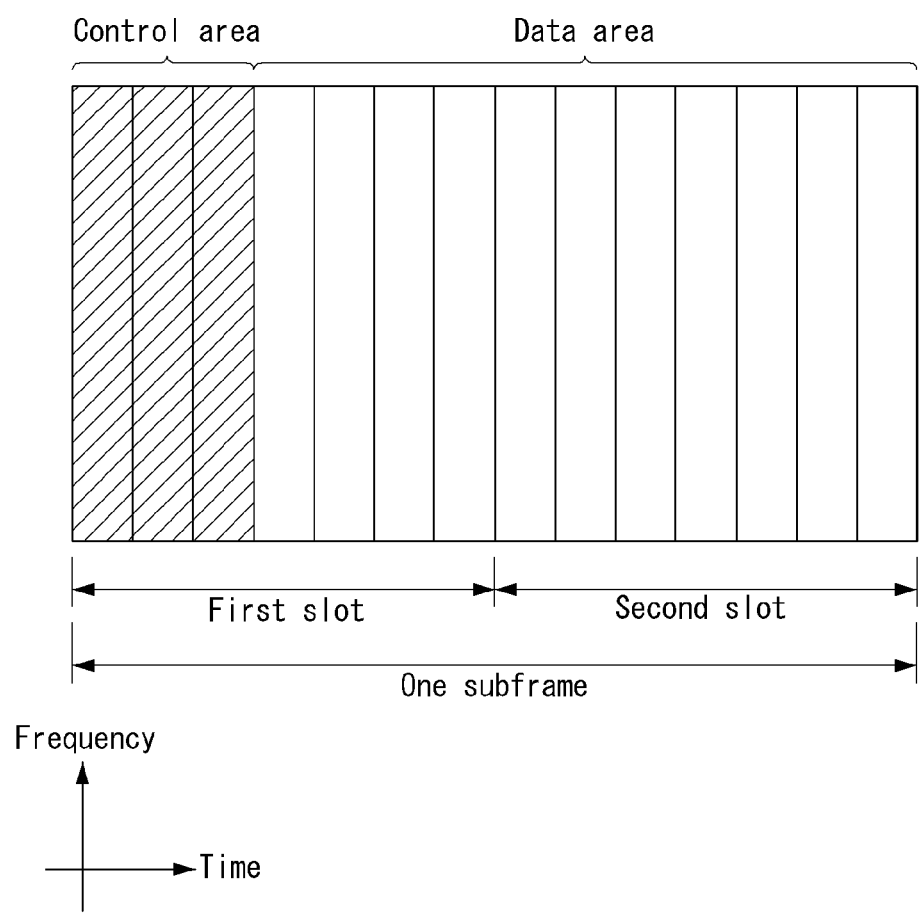

[FIG. 4]
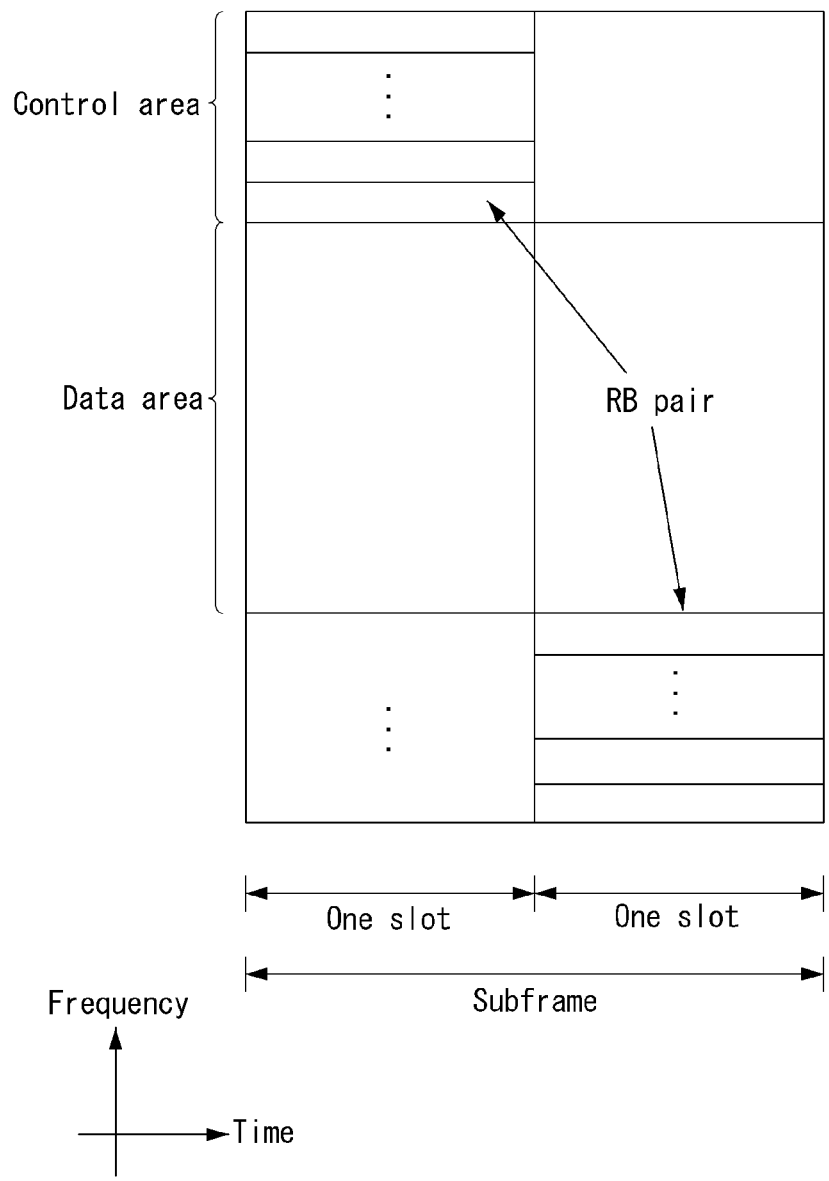

[FIG. 5]
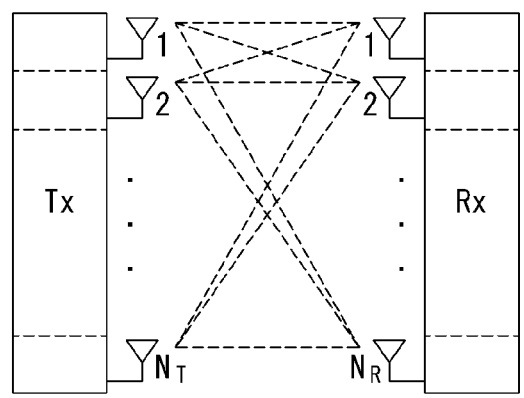
[FIG. 6]
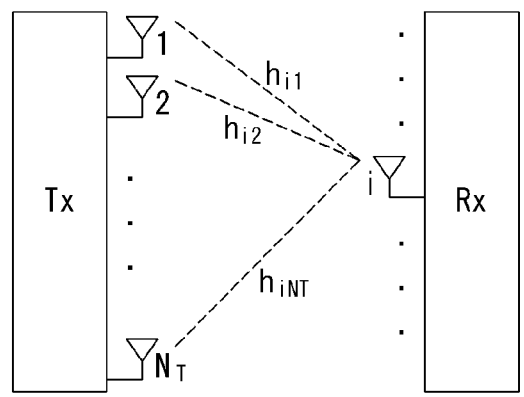

[FIG. 7]
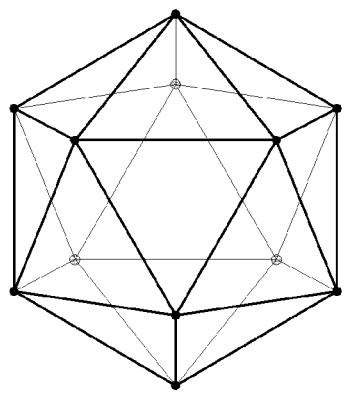
(a)
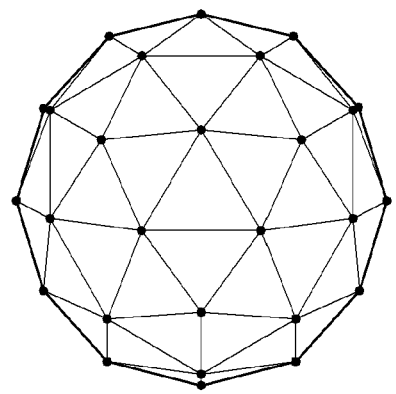
(b)
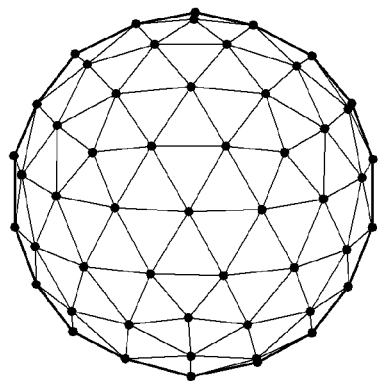
(c)
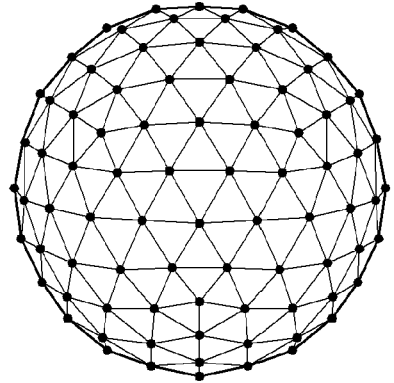
(d)

[FIG. 8]
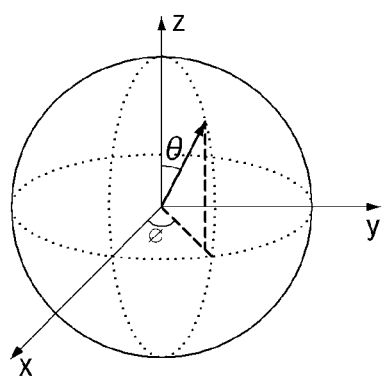 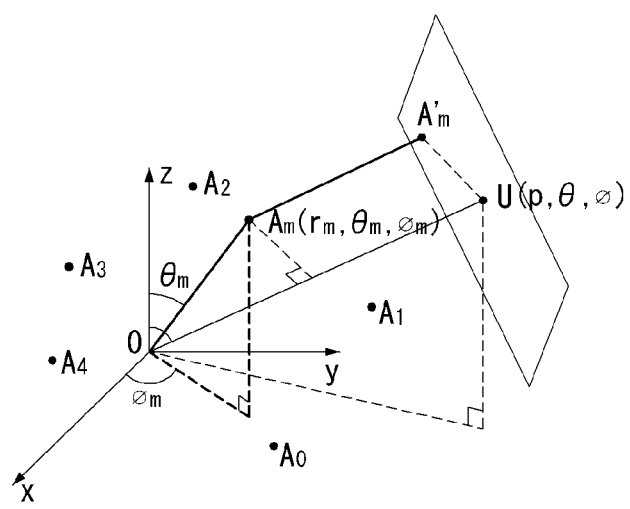
(a) (b)

[FIG. 9]
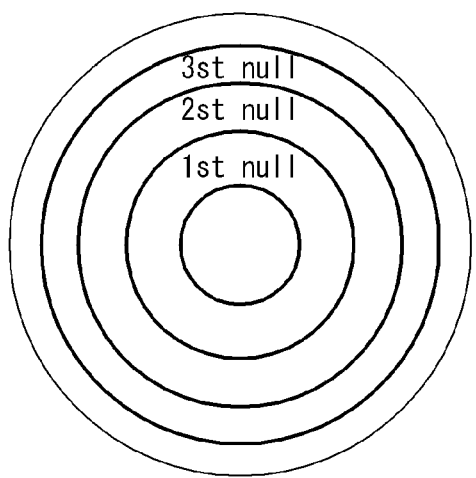
(a)
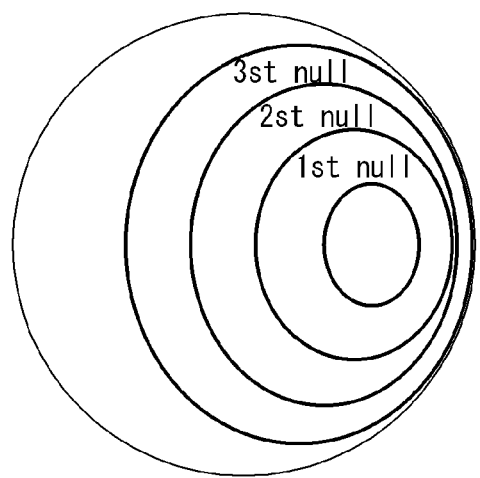
(b)

[FIG. 10]
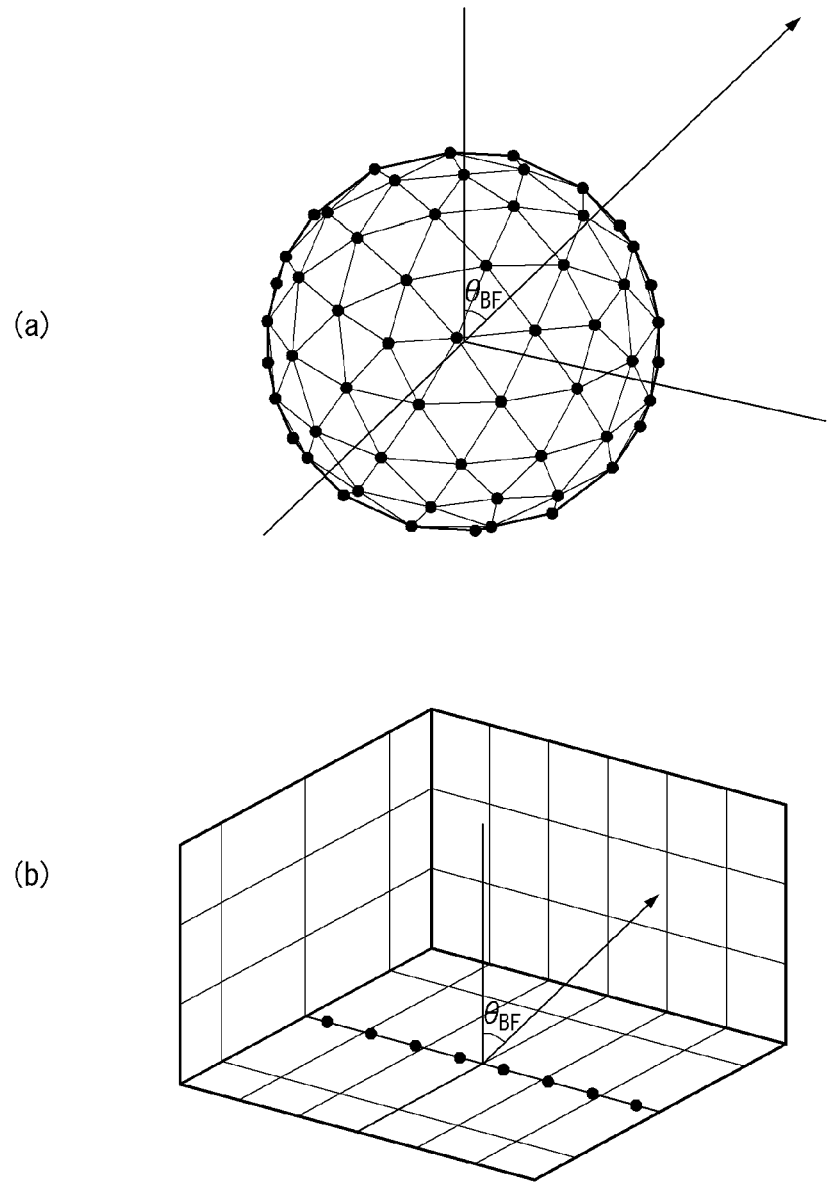

[FIG. 11]
(a)
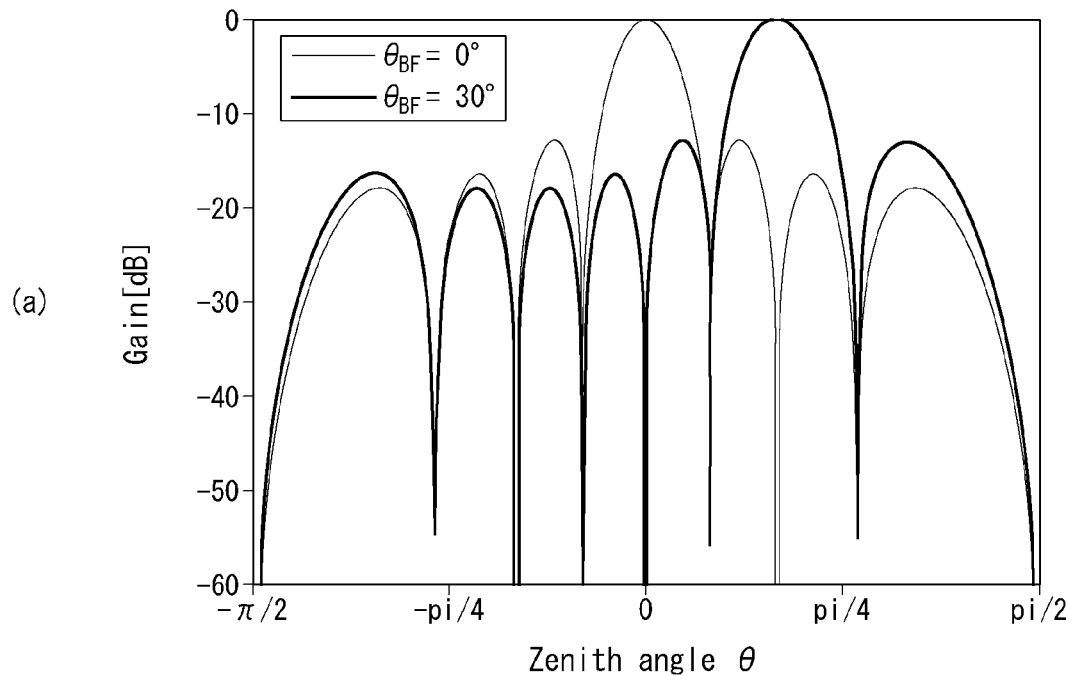
(b)
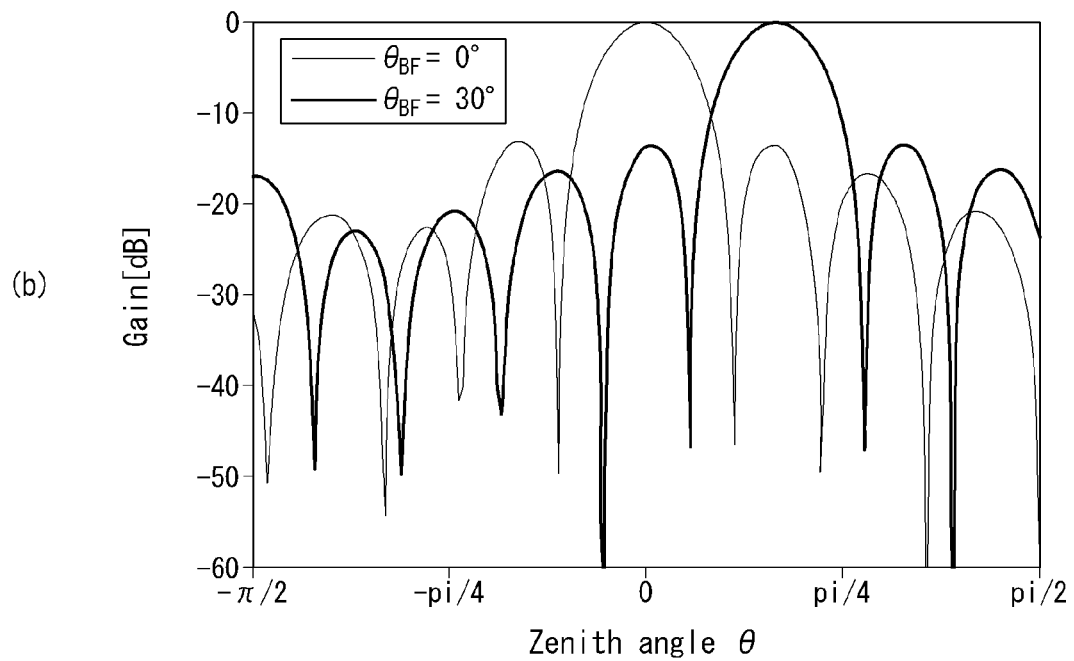

[FIG. 12]
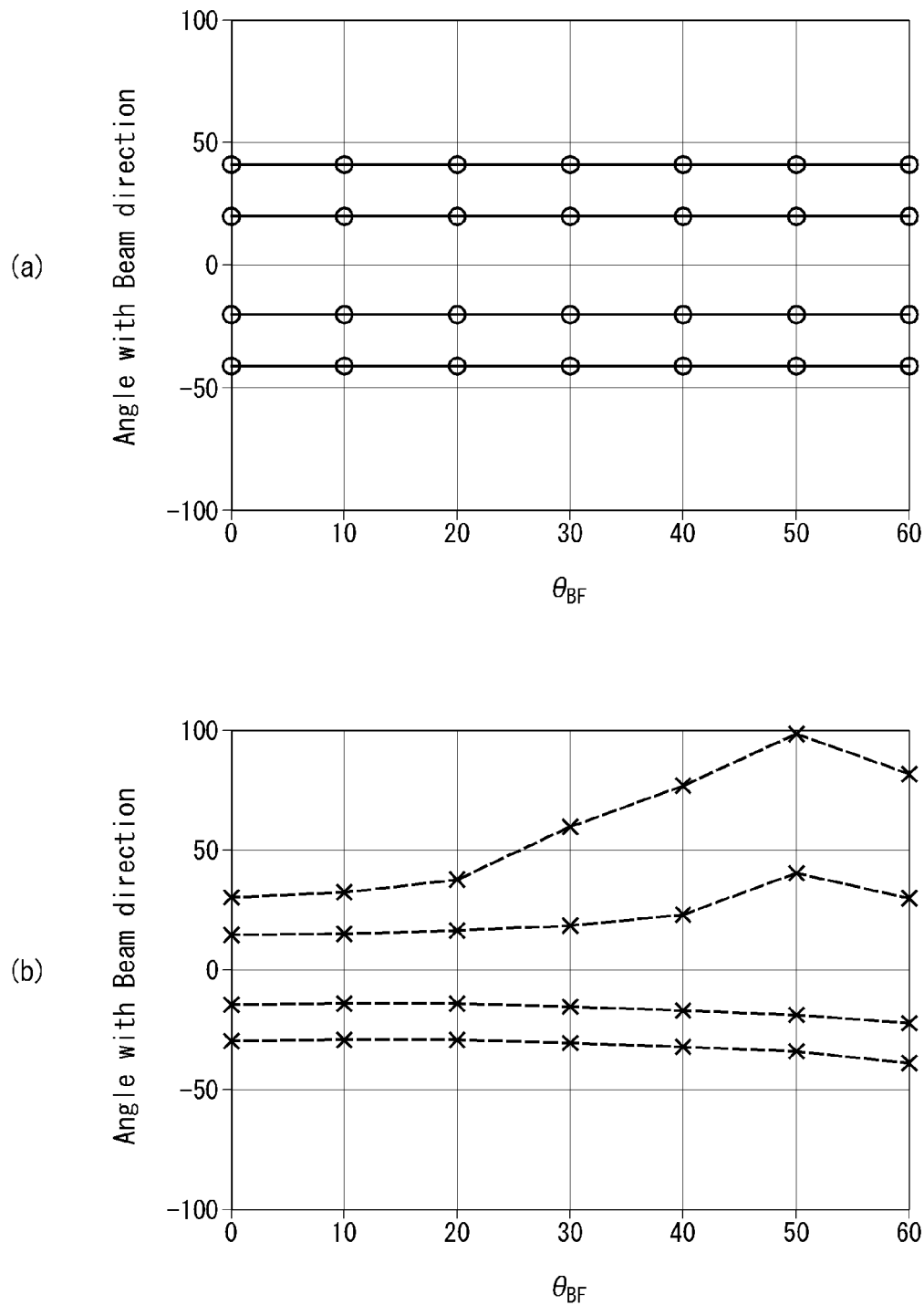

[FIG. 13]
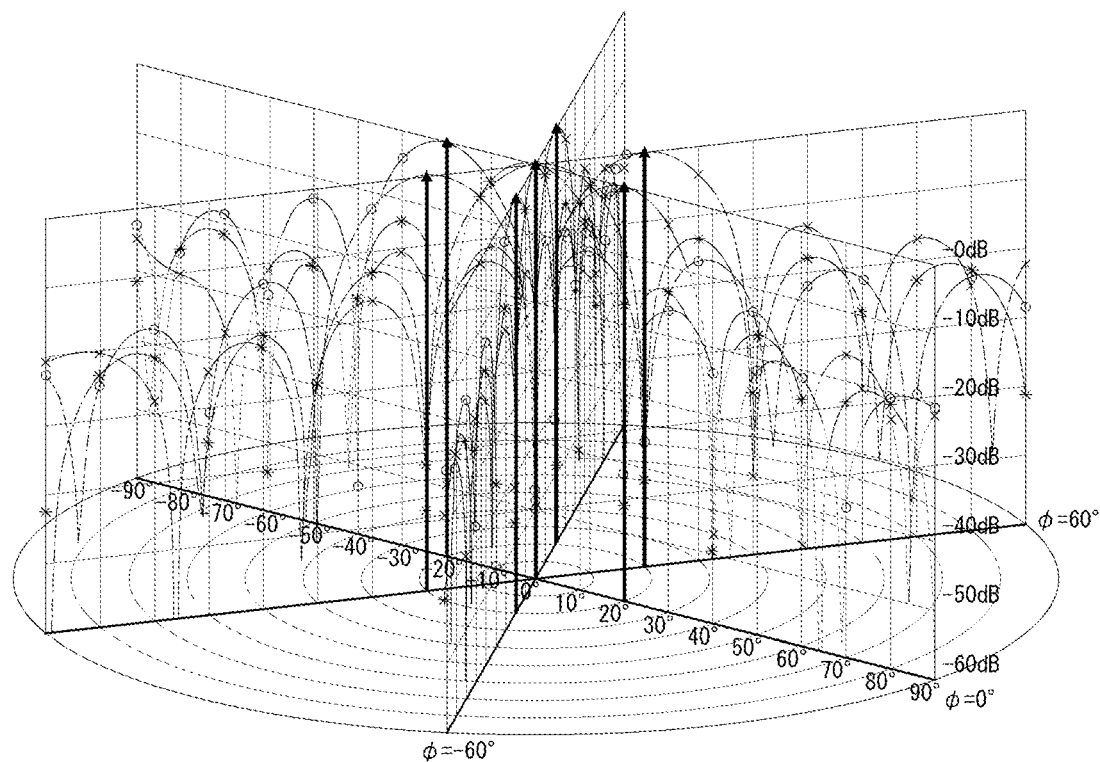

[FIG. 14]
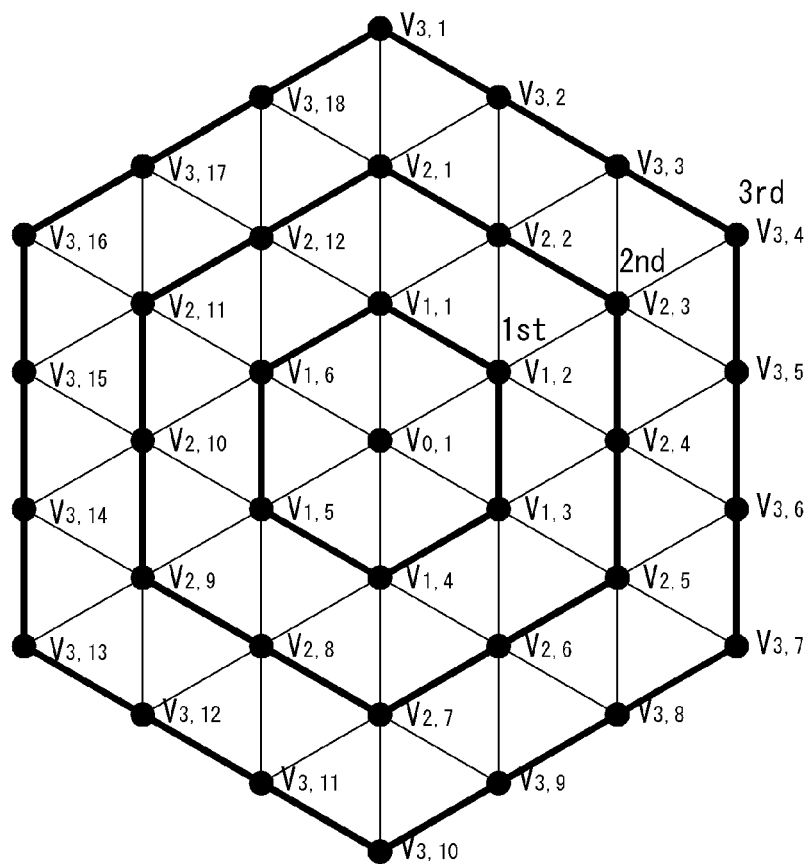

[FIG. 15]
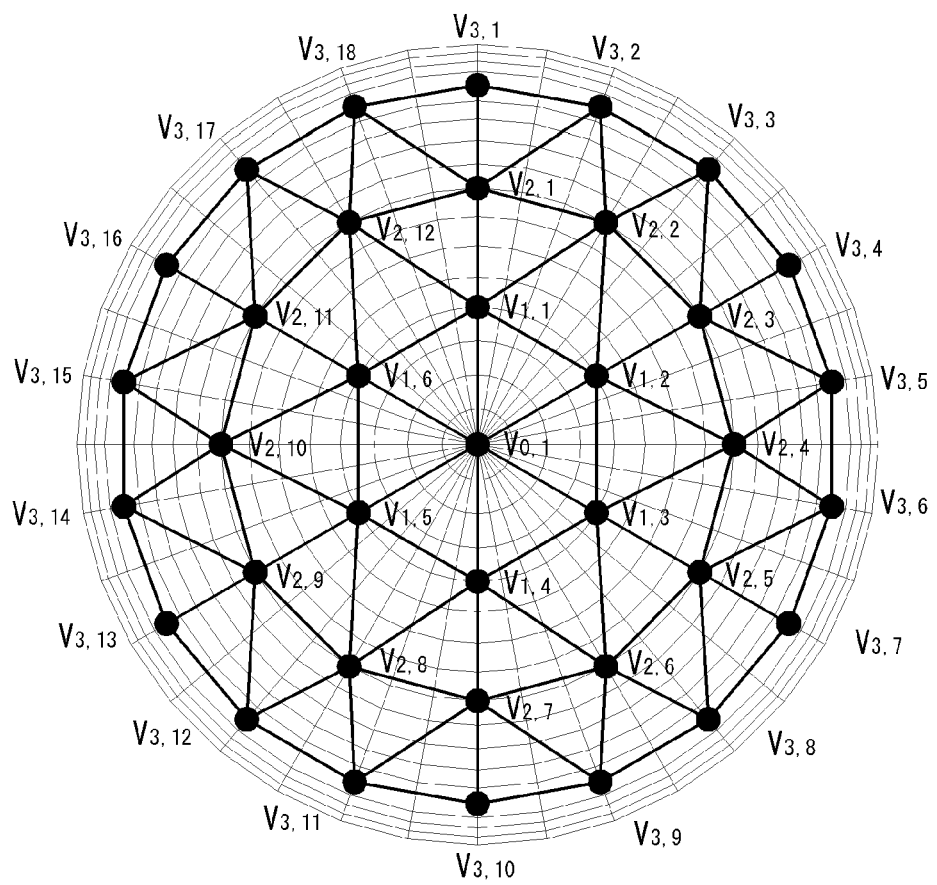

[FIG. 16]
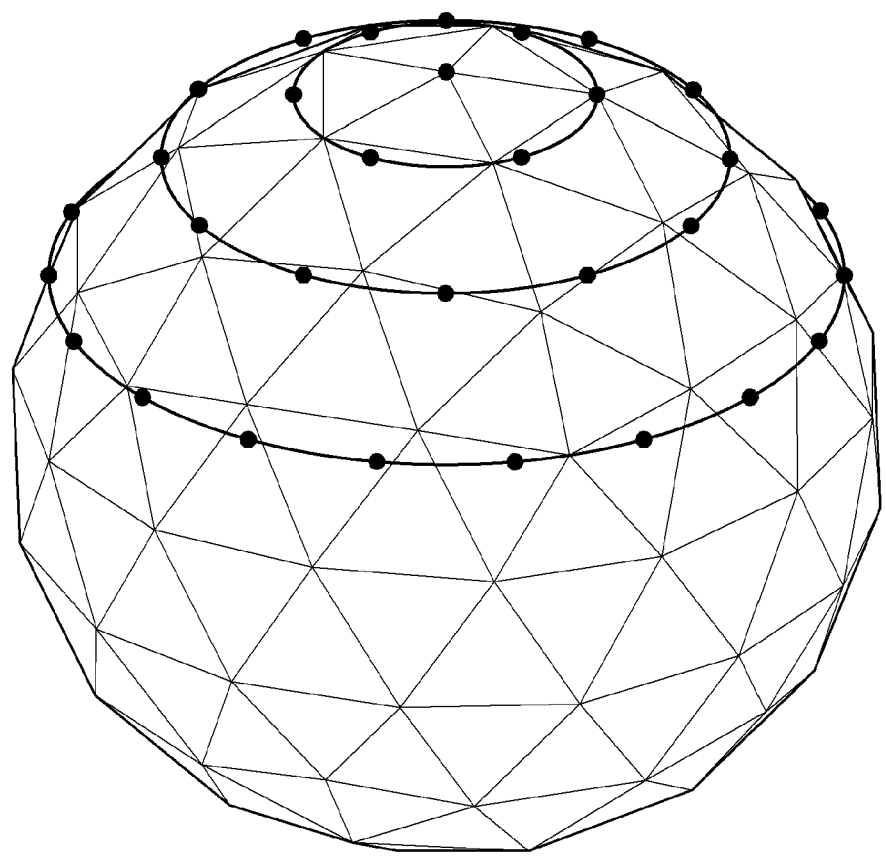

[FIG. 17]
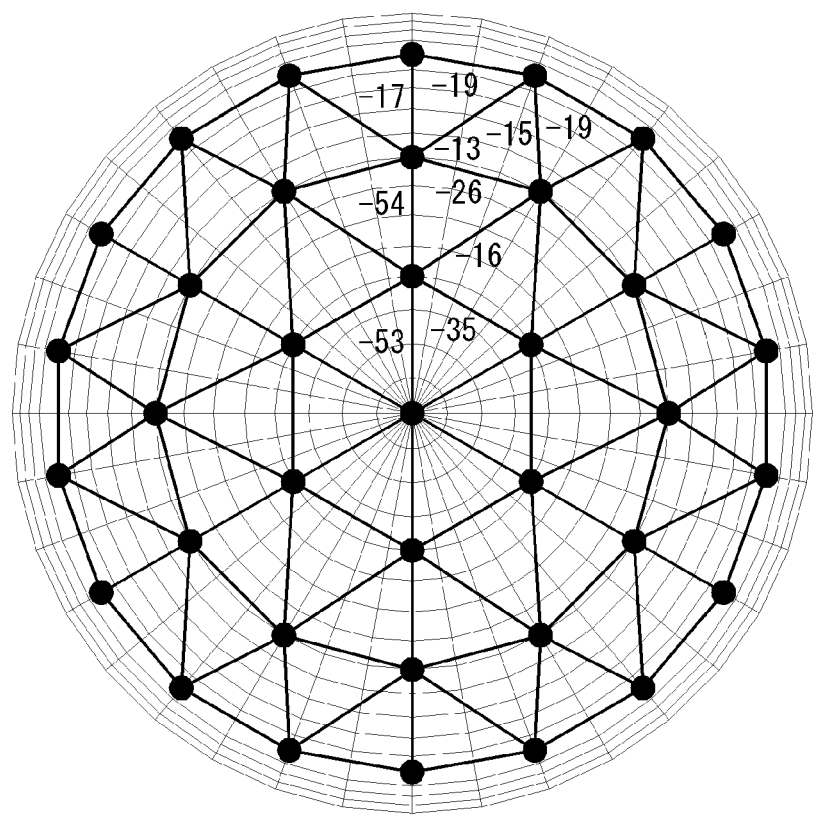

[FIG. 18]
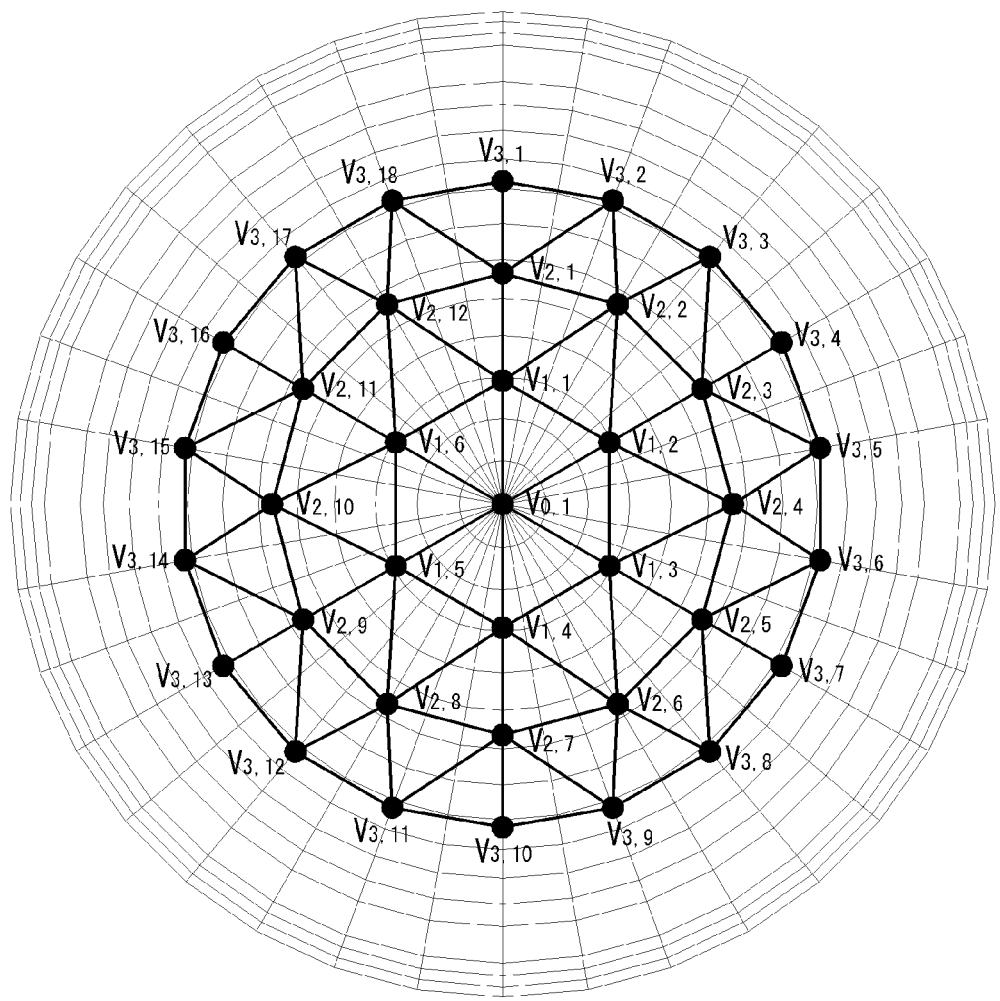

[FIG. 19]
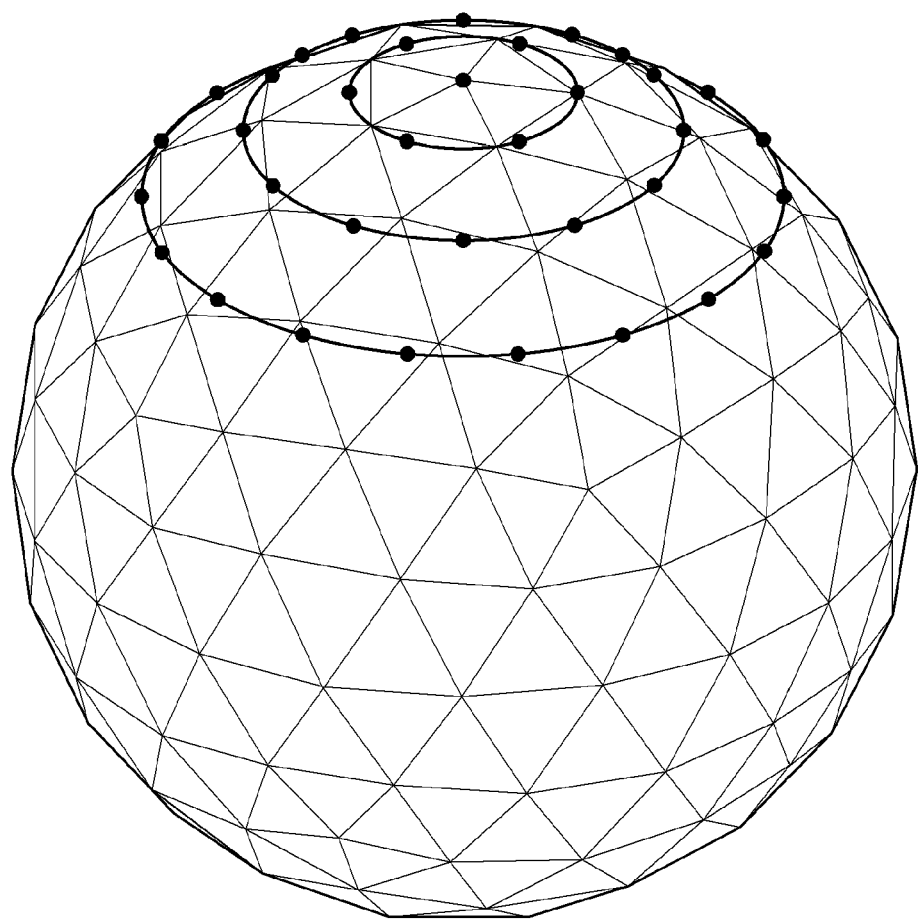

[FIG. 20]
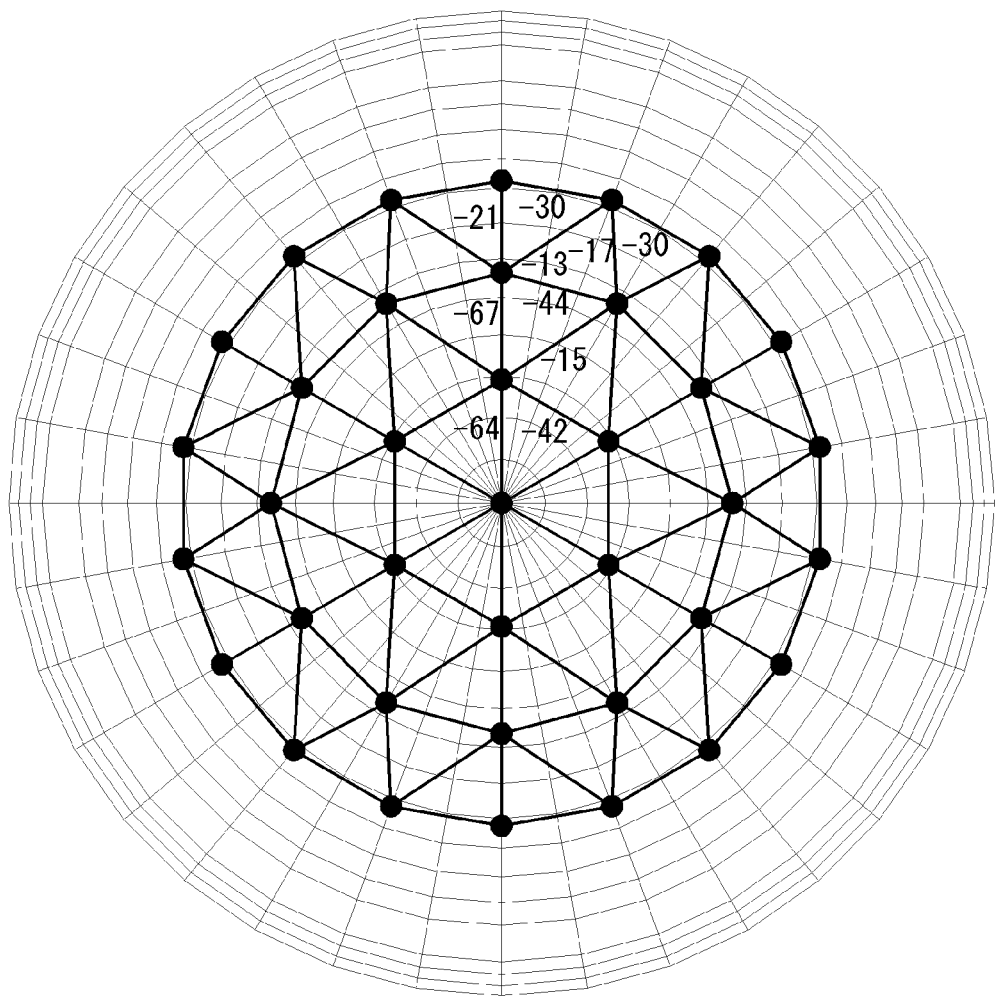

[FIG. 21]
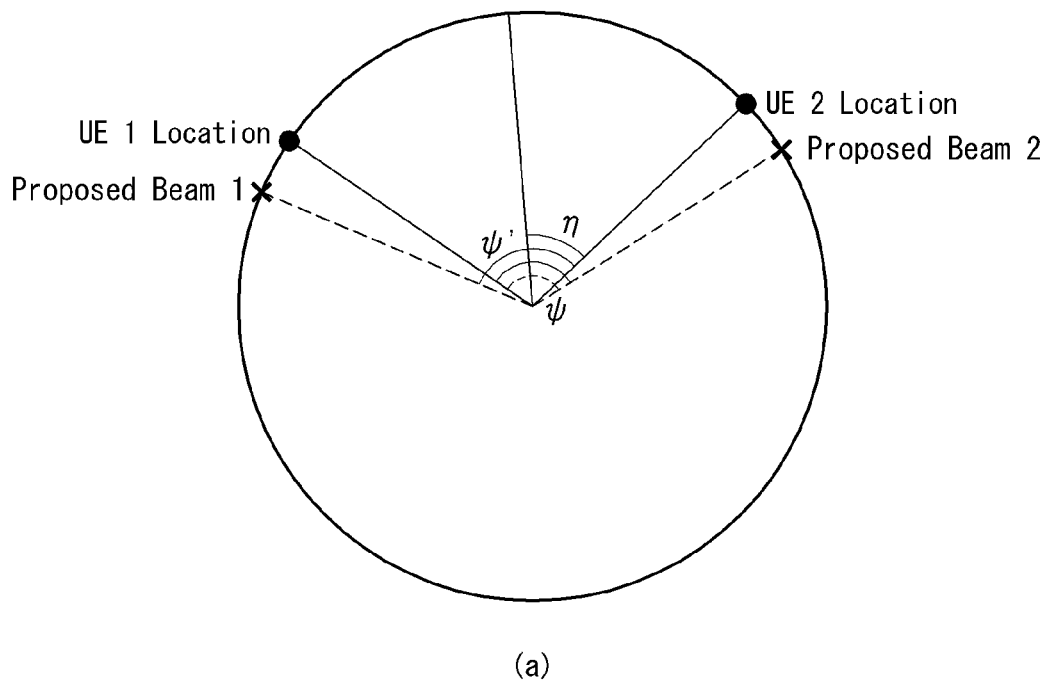
(a)
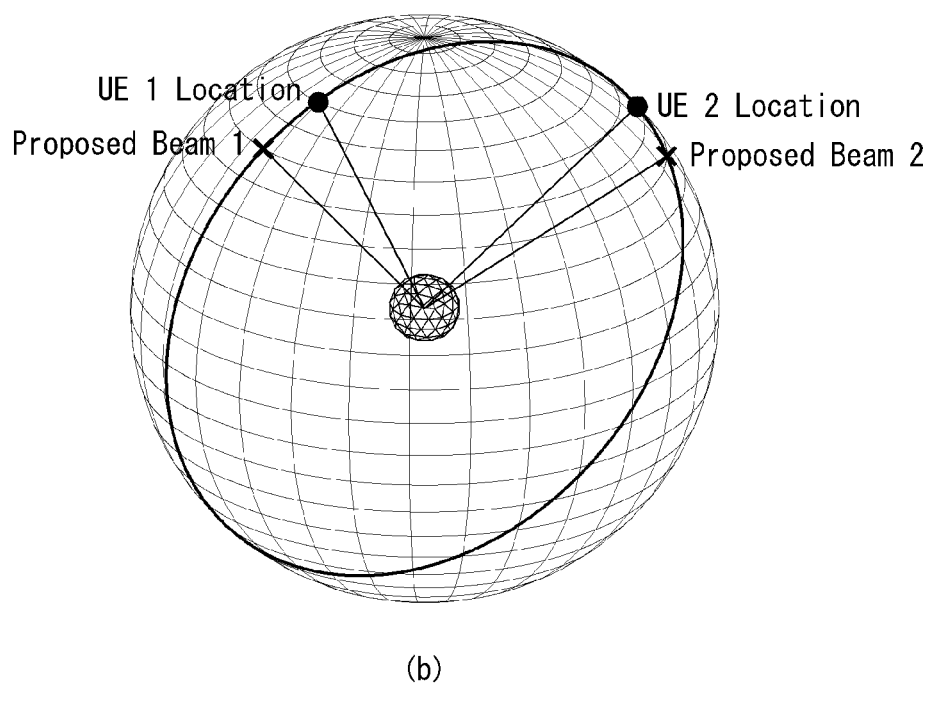
(b)

[FIG. 22]
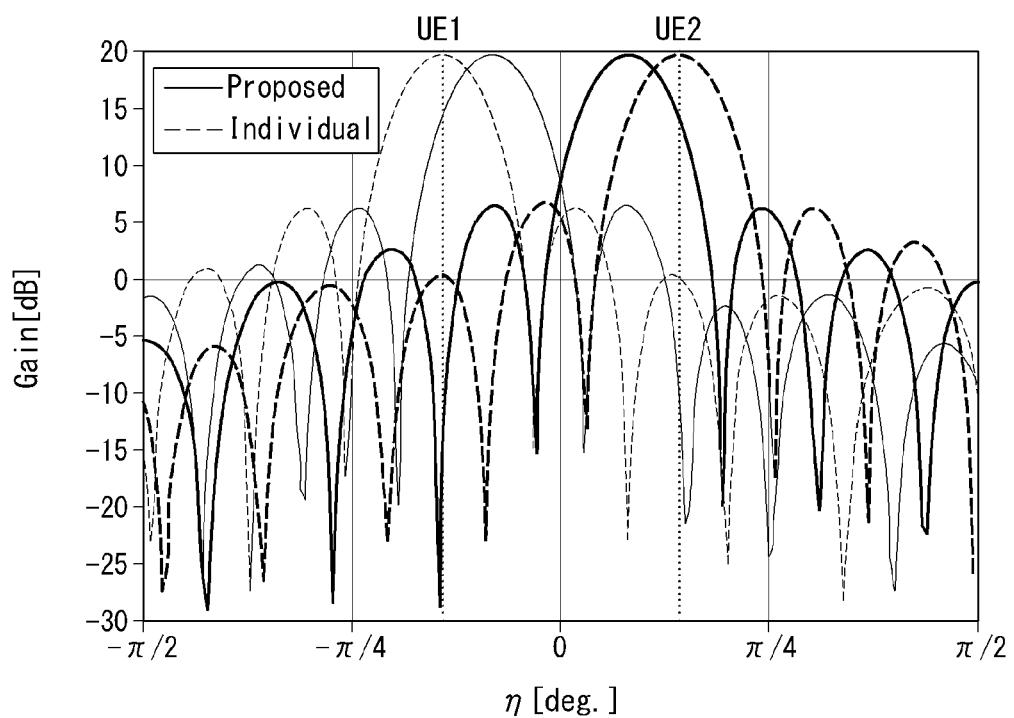

[FIG. 23]
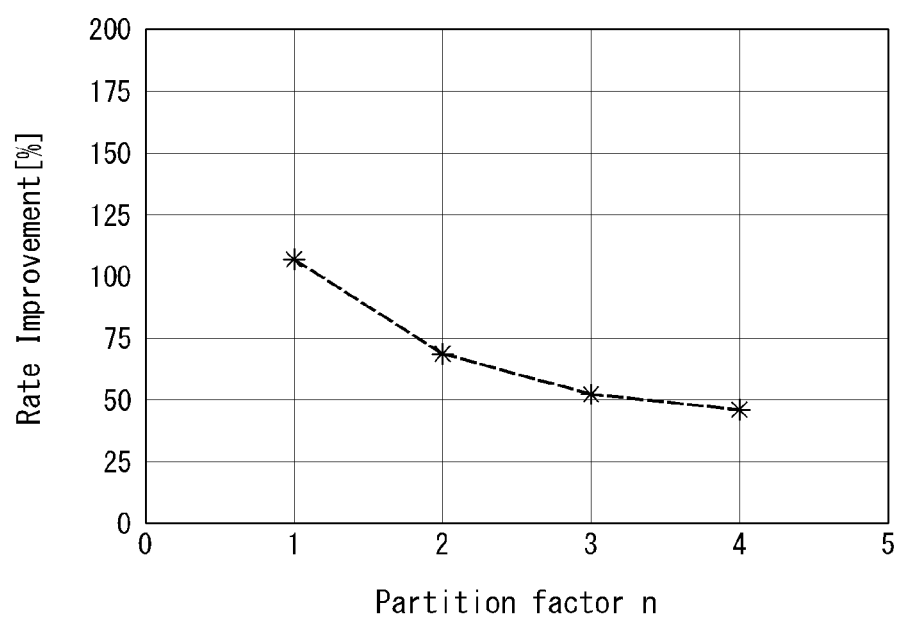

[FIG. 24]
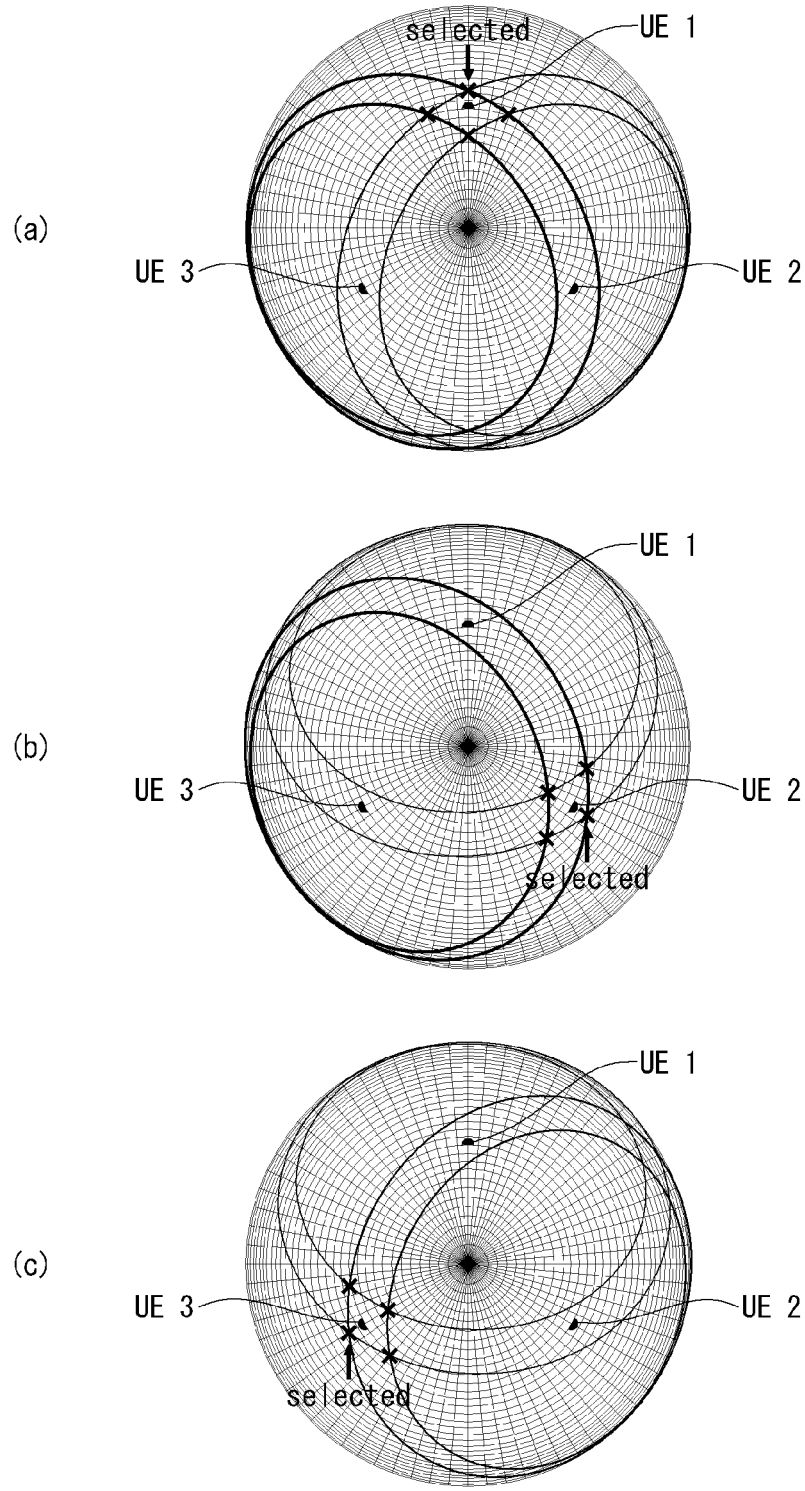

[FIG. 25]
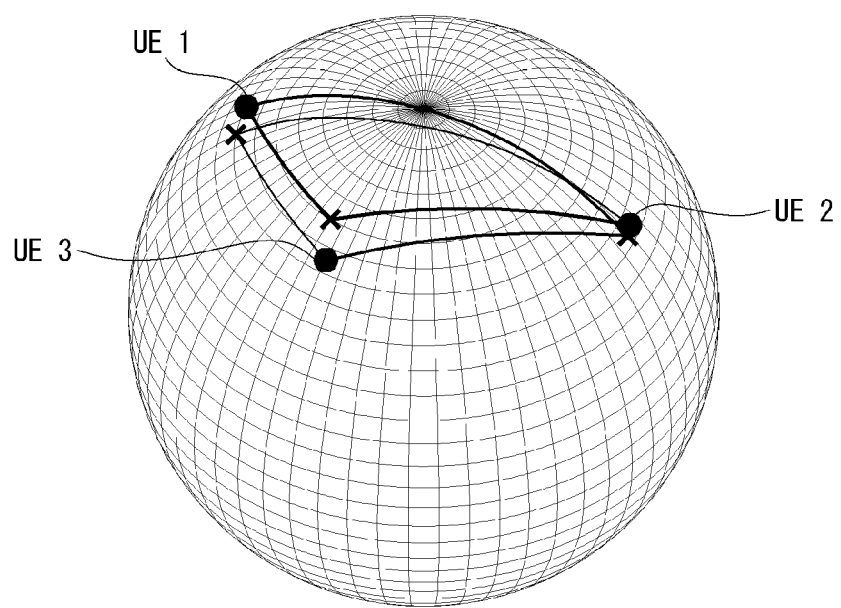

[FIG. 26]
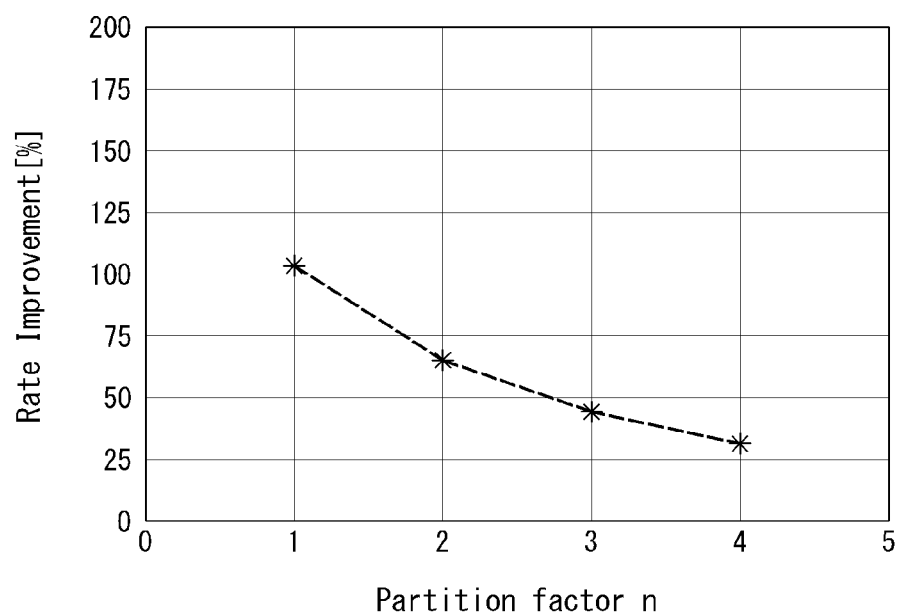

[FIG. 27]
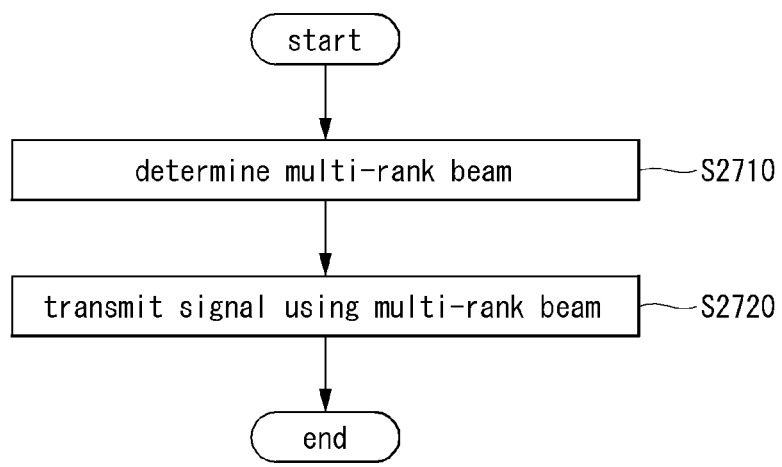

[FIG. 28]
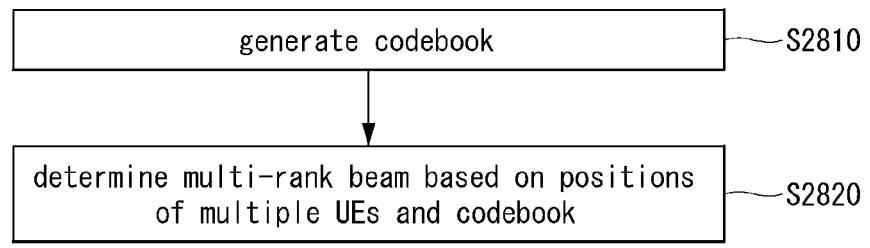

[FIG. 29]
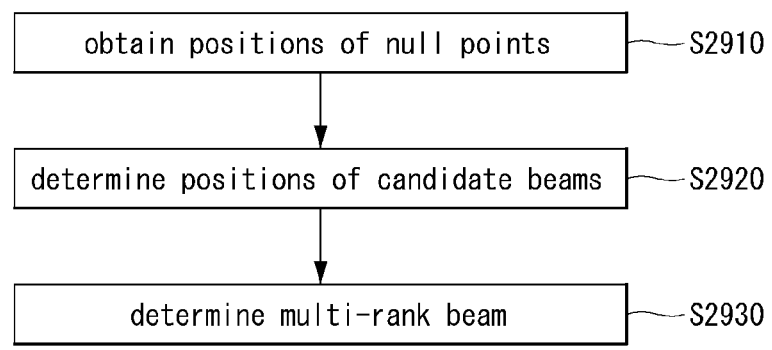

[FIG. 30]
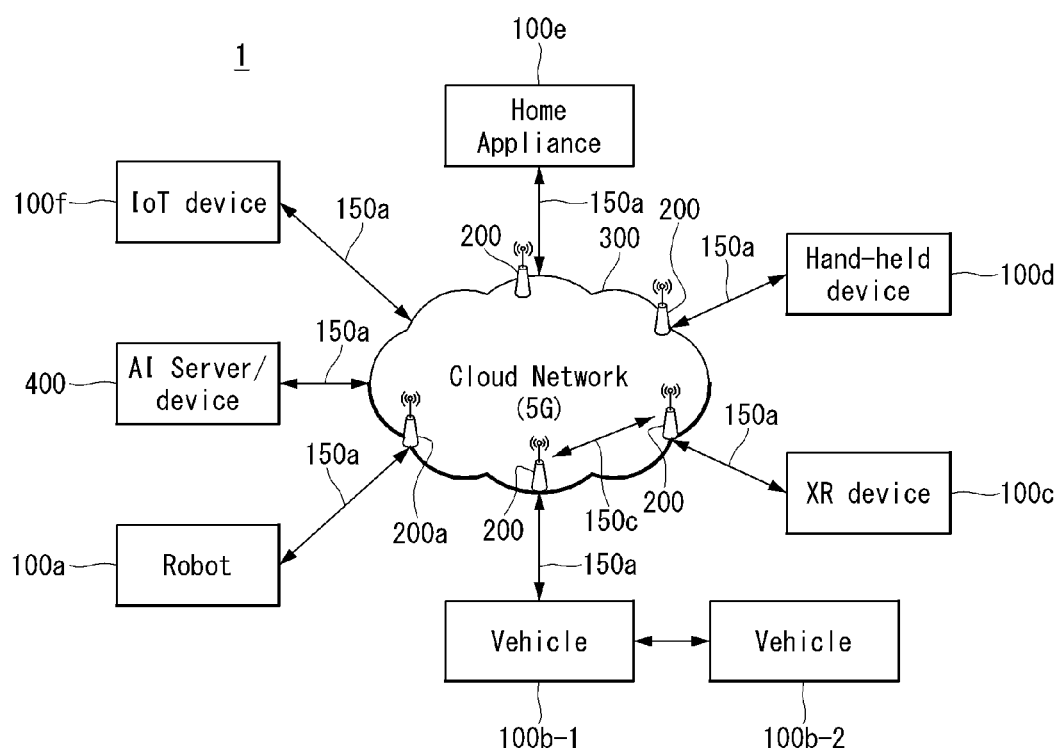

[FIG. 31]
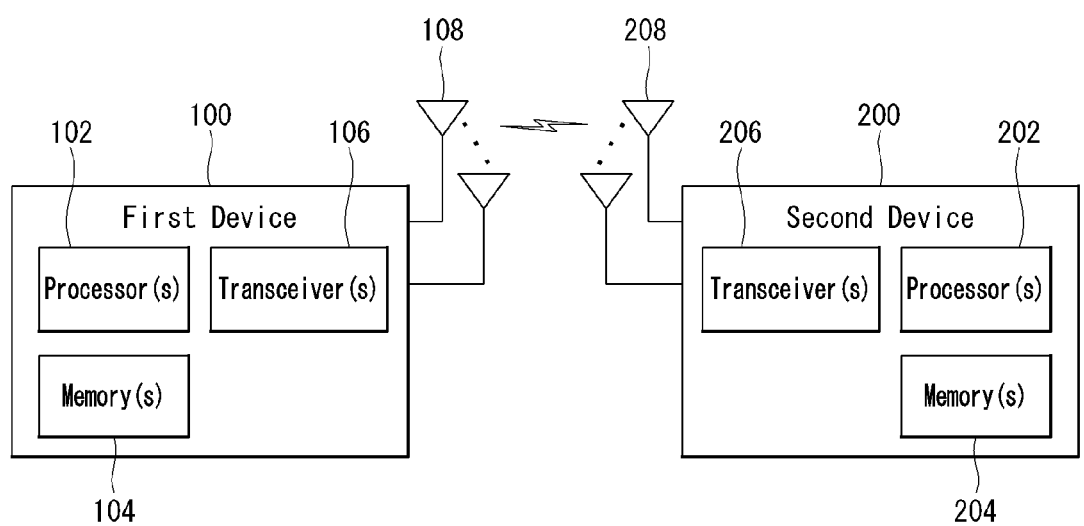

[FIG. 32]
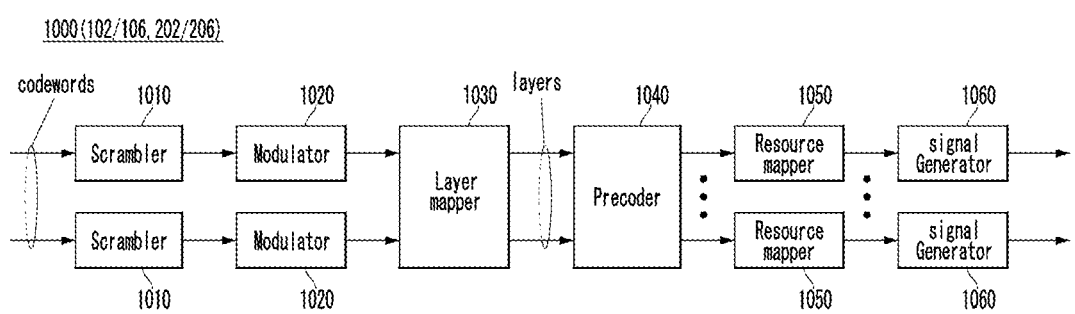

[FIG. 33]
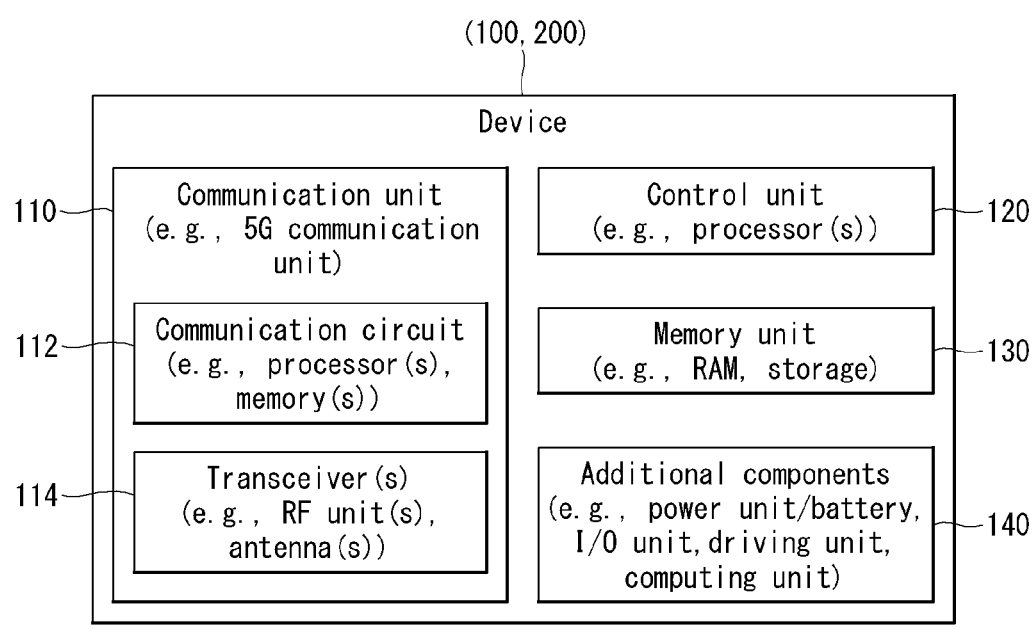

[FIG. 34]
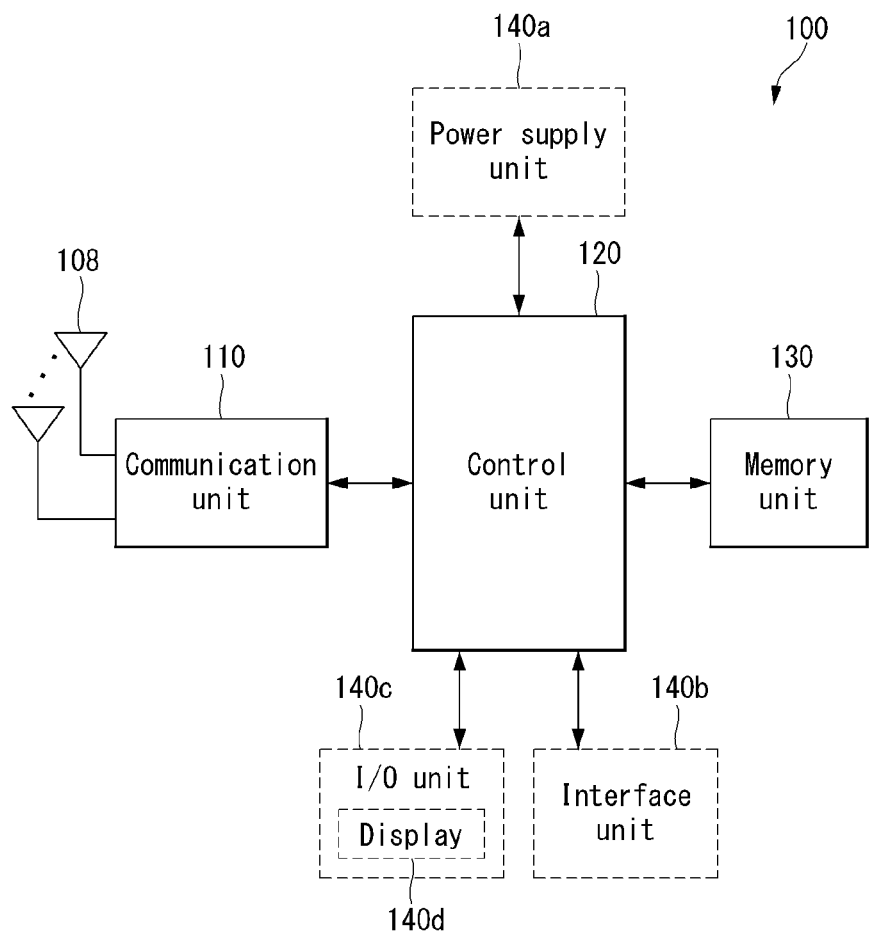

[FIG. 35]
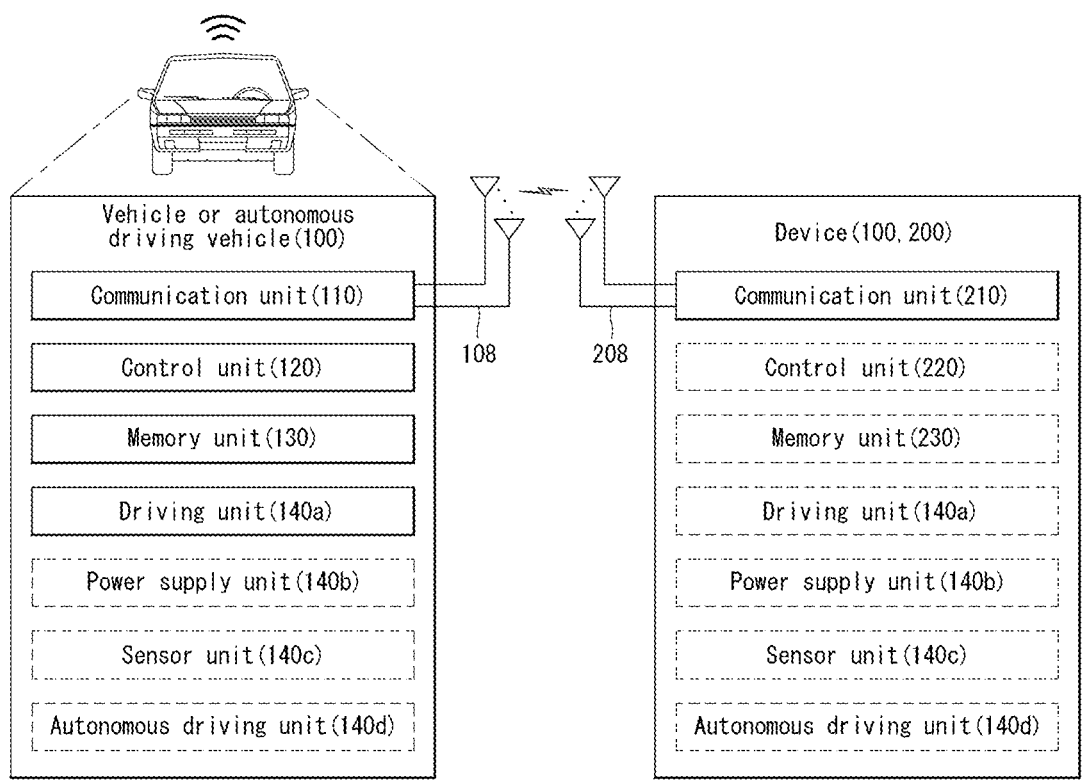

METHOD BY WHICH BASE STATION TRANSMITS SIGNAL ON BASIS OF ANTENNA ARRAY IN WIRELESS COMMUNICATION SYSTEM, AND APPARATUS THEREFOR

This application is the National Stage filing under 35 U.S.C. 371 of International Application No. PCT/KR2019/015511, filed on Nov. 14, 2019, which claims the benefit of KR Application No. 10-2018-0147153, filed on Nov. 26, 2018, the contents of which are all hereby incorporated by reference herein in their entirety.

TECHNICAL FIELD

The disclosure relates to methods and devices for transmitting a signal by a base station based on an antenna array in a wireless communication system.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DETAILED DESCRIPTION OF THE INVENTION

Technical Problems

The disclosure aims to propose a method for transmitting signals by a base station based on an antenna array and a device therefor.

The disclosure also aims to transmit signals to a plurality of UEs using beam characteristics according to the shape of an antenna array.

The disclosure also aims to transmit signals to a plurality of UEs considering a summated transmission rate.

Objects of the disclosure are not limited to the foregoing, and other unmentioned objects would be apparent to one of ordinary skill in the art from the following description.

Means to Address the Problems

According to an embodiment of the disclosure, a method for transmitting a signal by a base station based on an antenna array in a wireless communication system comprises determining a multi-rank beam based on (i) positions of a plurality of user equipment (UEs) and (ii) positions of null points of a beam generated via the antenna array and transmitting a signal to the plurality of UEs using the multi-rank beam.

The antenna array may be based on a three-dimensional shape having omnidirectional symmetry, and the positions of the null points and the positions of the plurality of UEs may be set based on a polar coordinate system having a center of the antenna array as an origin thereof.

Determining the multi-rank beam may include generating a codebook related to the multi-rank beam and determining the multi-rank beam based on the codebook and the positions of the plurality of UEs. The codebook includes a plurality of code vectors. Respective positions of the plurality of code vectors may be determined based on the positions of the null points.

The plurality of code vectors may be classified into a plurality of tiers. Zenith angles according to positions of code vectors included in the same tier may be the same.

A zenith angle according to a position of a code vector included in any one of the plurality of tiers may be an integer multiple of a specific zenith angle ($\Psi_1$).

The null points may be positioned on concentric circles that are centered on a direction of the beam formed by the antenna array and repeated at predetermined intervals. The specific zenith angle ($\Psi 1$) may be an average of zenith angles according to positions of specific null points. The specific null points may be null points positioned on a concentric circle closest to the beam formed by the antenna array among the null points.

Determining the multi-rank beam may include obtaining the positions of the null points formed by the beam of the antenna array toward each of the plurality of UEs, wherein the null points form concentric circles repeated at predetermined intervals on a surface of a sphere having a center of the antenna array as an origin thereof, determining crossings of the concentric circles as positions of candidate beams, and determining candidate beams selected according to a preset requirement among the candidate beams as the multi-rank beam.

The candidate beams selected according to the preset requirement may be candidate beams closest to the respective positions of the plurality of UEs.

Positions of the candidate beams closest to the respective positions of the plurality of UEs may be adjusted so that a summated transmission rate by the multi-rank beam is maximized.

the summated transmission rate is calculated by:

$$R = \log_2 \prod_k \frac{P_k}{\sum_{j \neq k} I_{kj}}$$

wherein R is the summated transmission rate, k is $1 \leq k \leq K$, K is a number of the plurality of UEs, j meets $1 \leq j \leq K$ and $j \neq k$, $P_k$ is received signal power of a candidate beam of a k-th UE among the plurality of UEs, and $I_{kj}$ is interference power given to the k-th UE by a candidate beam for a j-th UE among the plurality of UEs.

According to another embodiment of the disclosure, a base station transmitting a signal based on an antenna array in a wireless communication system comprises one or more transceivers, one or more processors, and one or more memories operably connectible to the one or more processors and storing instructions to, when executed by the one or more processors, perform operations.

The operations may include determining a multi-rank beam considering (i) positions of a plurality of user equipment (UEs) and (ii) positions of null points of a beam generated via the antenna array and transmitting a signal to the plurality of UEs using the multi-rank beam. The antenna array may be based on a three-dimensional shape having omnidirectional symmetry. The positions of the null points and the positions of the plurality of UEs may be set based on a polar coordinate system having a center of the antenna array as an origin thereof.

Determining the multi-rank beam may include generating a codebook related to the multi-rank beam and determining the multi-rank beam based on the codebook and the positions of the plurality of UEs. The codebook includes a plurality of code vectors. Respective positions of the plurality of code vectors may be determined based on the positions of the null points.

The plurality of code vectors may be classified into a plurality of tiers. Zenith angles according to positions of code vectors included in the same tier may be the same.

A zenith angle according to a position of a code vector included in any one of the plurality of tiers may be an integer multiple of a specific zenith angle ($\Psi_1$).

The null points may be positioned on concentric circles that are centered on a direction of the beam formed by the antenna array and repeated at predetermined intervals. The specific zenith angle ($\Psi_1$) may be an average of zenith angles according to positions of specific null points. The specific null points may be null points positioned on a concentric circle closest to the beam formed by the antenna array among the null points.

Determining the multi-rank beam may include obtaining the positions of the null points formed by the beam of the antenna array toward each of the plurality of UEs, wherein the null points form concentric circles repeated at predetermined intervals on a surface of a sphere having a center of the antenna array as an origin thereof, determining crossings of the concentric circles as positions of candidate beams, and determining candidate beams selected according to a preset requirement among the candidate beams as the multi-rank beam.

Effects of the Invention

According to an embodiment of the disclosure, a base station determines a multi-rank beam based on the positions of null points of a beam generated via an antenna array and the positions of a plurality of UEs and transmits signals to the plurality of beams using the multi-rank beam. The antenna array is based on a three-dimensional shape having omnidirectional symmetry. The shape allows the null points of a beam generated by the antenna array to have constant positions. Therefore, the disclosure may minimize inter-beam interference for each UE when simultaneously transmitting signals to the plurality of UEs.

Further, according to an embodiment of the disclosure, the multi-rank beam is determined based on the positions of the plurality of UEs and a codebook generated considering the positional characteristics of the null points according to the shape of the antenna array. The positions of the code vectors included in the codebook are determined based on the positions of the null points. Therefore, if a beam is formed based on any one code vector, the positions of the remaining code vectors coincide with the positions of the null points of the formed beam. Accordingly, the disclosure may determine a multi-rank beam in which inter-beam interference is minimized through the codebook.

Further, according to an embodiment of the disclosure, the base station obtains the positions of the null points by the beam for each of the plurality of UEs, and determines the crossings of the concentric circles formed by the null points as the positions of candidate beams. The base station determines the candidate beam closest to the position of each of the plurality of UEs among the candidate beams as the multi-rank beam, and adjusts the position of each candidate beam selected so that the summated transmission rate is maximized. Accordingly, the disclosure may determine a multi-rank beam to maximize the summated transmission rate for the plurality of UEs, thus enhancing the efficiency of multi-rank transmission.

Effects of the disclosure are not limited to the foregoing, and other unmentioned effects would be apparent to one of ordinary skill in the art from the following description.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein:

FIG. 1 is a view illustrating an example structure of an LTE radio frame.

FIG. 2 is a view illustrating an example resource grid for a downlink slot.

FIG. 3 illustrates an example downlink subframe structure.

FIG. 4 illustrates an example uplink subframe structure.

FIG. 5 is a block diagram illustrating a general multiple input/output antenna (MIMO) communication system.

FIG. 6 is a view illustrating channels from a plurality of transmit antennas to one receive antenna.

FIG. 7 illustrates a shape of an antenna array when an icosahedron is geodesically subdivided according to an embodiment of the disclosure.

FIG. 8 is a view illustrating a transmission path of an antenna in relation to a 3D spherical coordinate system.

FIG. 9 is a view illustrating null point characteristics of an antenna array according to an embodiment of the disclosure.

FIG. 10 is a view illustrating comparison between an antenna element arrangement of a geodesic 3-subdivision array antenna and an antenna element arrangement of a uniform linear array according to an embodiment of the disclosure.

FIG. 11 illustrates graphs of a beam shape of a geodesic 3-subdivision array and a beam shape of a uniform linear array based on changes in zenith angle according to an embodiment of the disclosure.

FIG. 12 illustrates graphs of the positions of null points of a geodesic 3-subdivision array and the positions of null points of a uniform linear array based on changes in zenith angle according to an embodiment of the disclosure.

FIG. 13 is a view illustrating an example beam pattern of a geodesic antenna array according to an embodiment of the disclosure.

FIG. 14 is a view illustrating selecting positions of code vectors in relation to a codebook configuration for an antenna array according to an embodiment of the disclosure.

FIG. 15 is a view illustrating the positions of code vectors in relation to a codebook configuration of a geodesic 3-subdivision antenna array according to an embodiment of the disclosure.

FIG. 16 is a view illustrating displaying the positions of code vectors constituting a codebook on a geodesic 3-subdivision antenna array according to an embodiment of the disclosure.

FIG. 17 is a view illustrating inter-code vector interference in a codebook of a geodesic 3-subdivision array according to an embodiment of the disclosure.

FIG. 18 is a view illustrating the positions of code vectors in relation to a codebook configuration of a geodesic 4-subdivision antenna array according to an embodiment of the disclosure.

FIG. 19 is a view illustrating displaying the positions of code vectors constituting a codebook on a geodesic 4-subdivision antenna array according to an embodiment of the disclosure.

FIG. 20 is a view illustrating inter-code vector interference in a codebook of a geodesic 4-subdivision array according to an embodiment of the disclosure.

FIG. 21 is a view illustrating a method for transmitting beams to a plurality of UEs using an antenna array according to an embodiment of the disclosure.

FIG. 22 is a view illustrating positions of null points in relation to a summated transmission rate when transmitting beams to a plurality of UEs using an antenna array according to an embodiment of the disclosure.

FIG. 23 is a graph illustrating an increase rate of a summated transmission rate when an algorithm for increasing the summated transmission rate is applied based on two UEs according to an embodiment of the disclosure.

FIG. 24 is a view illustrating adjustment of beam positions for each UE in relation to an algorithm for increasing the summated transmission rate according to an embodiment of the disclosure.

FIG. 25 is a view illustrating the results of adjustment of beam positions for each UE to increase the summated transmission rate according to an embodiment of the disclosure.

FIG. 26 is a graph illustrating an increase rate of a summated transmission rate when an algorithm for increasing the summated transmission rate is applied based on three UEs according to an embodiment of the disclosure.

FIG. 27 is a flowchart illustrating a method for transmitting signals by a base station based on an antenna array according to an embodiment of the disclosure.

FIG. 28 is a flowchart illustrating an example of specifying the step of determining a multi-rank beam in a method for transmitting a signal by a base station based on an antenna array according to an embodiment of the disclosure.

FIG. 29 is a flowchart illustrating another example of specifying the step of determining a multi-rank beam in a method for transmitting a signal by a base station based on an antenna array according to an embodiment of the disclosure.

FIG. 30 illustrates an example communication system 1 applied to the disclosure.

FIG. 31 illustrates an example wireless device applicable to the disclosure.

FIG. 32 illustrates an example signal processing circuit applied to the disclosure.

FIG. 33 illustrates another example wireless device applied to the disclosure.

FIG. 34 illustrates a portable device applied to the disclosure.

FIG. 35 illustrates a vehicle or an autonomous vehicle applied to the disclosure.

MODE TO PRACTICE THE INVENTION

Reference will now be made in detail to the preferred embodiments of the disclosure, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the disclosure. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the disclosure.

In the disclosure, a base station has the meaning of a terminal node of a network over which the base station directly communicates with a terminal In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the disclosure, and these specific terms may be replaced with other terms without departing from the technical sprit of the disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink. LTE-advanced (LTE-A) is an evolution of the 3GPP LTE.

Embodiments of the disclosure may be supported by the standard documents disclosed in at least one of IEEE 802, 3GPP, and 3GPP2, that is, radio access systems. That is, steps or portions that belong to the embodiments of the disclosure and that are not described in order to clearly expose the technical spirit of the disclosure may be supported by the documents. Furthermore, all terms disclosed in this document may be described by the standard documents.

For clarity, this application focuses on the 3GPP LTE/ LIE-A. However, technical features of the disclosure are not limited thereto.

LTE System in General

FIG. 1 is a diagram showing an example of an LTE radio frame structure.

In FIG. 1, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

FIG. 2 is a diagram showing an example of a resource grid for a downlink slot.

In FIG. 2, a downlink slot includes a plurality of OFDM symbols in time domain. It is described herein that one downlink slot includes 7 OFDM symbols, and one resource block (RB) includes 12 subcarriers in frequency domain as an example. However, the disclosure is not limited thereto. Each element on the resource grid is referred to as a resource element (RE). One RB includes 12×7 REs. The number NDL of RBs included in the downlink slot depends on a downlink transmit bandwidth. The structure of an uplink slot may be same as that of the downlink slot.

FIG. 3 shows an example of a downlink subframe structure.

In FIG. 3, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

FIG. 4 shows an example of an uplink subframe structure.

In FIG. 4, an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

Hereinafter, an LTE frame structure is described more specifically.

Throughout LTE specification, unless otherwise noted, the size of various fields in the time domain is expressed as a number of time units $T_s=1/(15000 \times 2048)$ seconds.

Downlink and uplink transmissions are organized into radio frames with $T_f=307200 \times T_s=10$ ms duration. Two radio frame structures are supported:
  Type 1: applicable to FDD
  Type 2: applicable to TDD
  Frame Structure Type 1
Frame structure type 1 is applicable to both full duplex and half duplex FDD. Each radio frame is $T_f=307200 \cdot T_s=10$ ms long and consists of 20 slots of length $T_{slot}=15360 \cdot T_s=0.5$ ms, numbered from 0 to 19. A subframe is defined as two consecutive slots where subframe i consists of slots 2i and 2i+1.

For FDD, 10 subframes are available for downlink transmission and 10 subframes are available for uplink transmissions in each 10 ms interval.

Uplink and downlink transmissions are separated in the frequency domain. In half-duplex FDD operation, the UE cannot transmit and receive at the same time while there are no such restrictions in full-duplex FDD.

Hereinafter, it will described in relation to the frequency band of the NR system to which the disclosure can be applied.

NR supports multiple numerologies (or subcarrier spacings (SCS)) for supporting various 5G services. For example, if SCS is 15 kHz, NR supports a wide area in typical cellular bands. If SCS is 30 kHz/60 kHz, NR supports a dense urban, lower latency and a wider carrier bandwidth. If SCS is 60 kHz or higher, NR supports a bandwidth greater than 24.25 GHz in order to overcome phase noise.

An NR frequency band is defined as a frequency range of two types FR1 and FR2. The FR1 and the FR2 may be configured as in Table 1 below. Furthermore, the FR2 may mean a millimeter wave (mmW).

TABLE 1

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Multi-Input Multi-Output (MIMO)

A MIMO technology uses multiple transmitting (Tx) antennas and multiple receiving (Rx) antennas by breaking from generally one transmitting antenna and one receiving antenna up to now. In other words, the MIMO technology is a technology for achieving capacity increment or capability enhancement by using a multiple input multiple output antenna at a transmitter side or a receiver side of the wireless communication system. Hereinafter, "MIMO" will be referred to as "multiple input multiple output antenna".

In more detail, the MIMO technology does not depend on one antenna path in order to receive one total message and completes total data by collecting a plurality of data pieces received through multiple antennas. Consequently, the MIMO technology may increase a data transfer rate within in a specific system range and further, increase the system range through a specific data transfer rate.

In next-generation mobile communication, since a still higher data transfer rate than the existing mobile communication is required, it is anticipated that an efficient multiple input multiple output technology is particularly required. In such a situation, a MIMO communication technology is a next-generation mobile communication technology which may be widely used in a mobile communication terminal and a relay and attracts a concern as a technology to overcome a limit of a transmission amount of another mobile communication according to a limit situation due to data communication extension, and the like.

Meanwhile, the multiple input multiple output (MIMO) technology among various transmission efficiency improvement technologies which have been researched in recent years as a method that may epochally improve a communication capacity and transmission and reception performance without additional frequency allocation or power increment has the largest attention in recent years.

FIG. 5 is a configuration diagram of a general multiple input multiple output (MIMO) communication system.

Referring to FIG. 5, when the number of transmitting antennas increases to NT and the number of receiving antennas increases to NR at the same time, since a theoretical channel transmission capacity increases in proportion to the number of antennas unlike a case using multiple antennas only in a transmitter or a receiver, a transfer rate may be improved and frequency efficiency may be epochally improved. In this case, the transfer rate depending on an increase in channel transmission capacity may theoretically increase to a value acquired by multiplying a maximum transfer rate (Ro) in the case using one antenna by a rate increase rate (Ri) given below.

$$R_i = \min(N_T, N_R) \qquad \text{[Equation 1]}$$

That is, for example, in a MIMO communication system using four transmitting antennas and four receiving antennas, a transfer rate which is four times higher than a single antenna system may be acquired.

Such a MIMO antenna technology may be divided into a spatial diversity scheme increasing transmission reliability by using symbols passing through various channel paths and a spatial multiplexing scheme improving the transfer rate by simultaneously transmitting multiple data symbols by using multiple transmitting antennas. Further, a research into a scheme that intends to appropriately acquire respective advantages by appropriately combining two schemes is also a field which has been researched in recent years.

The respective schemes will be described below in more detail.

First, the spatial diversity scheme includes a space-time block coding series and a space-time Trelis coding series scheme simultaneously using a diversity gain and a coding gain. In general, the Trelis is excellent in bit error rate enhancement performance and code generation degree of freedom, but the space-time block code is simple in operational complexity. In the case of such a spatial diversity gain, an amount corresponding to a multiple (NT×NR) of the number (NT) of transmitting antennas and the number (NR) of receiving antennas may be acquired.

Second, the spatial multiplexing technique is a method that transmits different data arrays in the respective transmitting antennas and in this case, mutual interference occurs among data simultaneously transmitted from the transmitter in the receiver. The receiver receives the data after removing the interference by using an appropriate signal processing technique. A noise removing scheme used herein includes a maximum likelihood detection (MLD) receiver, a zero-forcing (ZF) receiver, a minimum mean square error (MMSE) receiver, a diagonal-bell laboratories layered space-time (D-BLAST), a vertical-bell laboratories layered space-time), and the like and in particular, when channel information may be known in the transmitter side, a singular value decomposition (SVD) scheme, and the like may be used.

Third, a technique combining the space diversity and the spatial multiplexing may be provided. When only the spatial diversity gain is acquired, the performance enhancement gain depending on an increase in diversity degree is gradually saturated and when only the spatial multiplexing gain is acquired, the transmission reliability deteriorates in the radio channel. Schemes that acquire both two gains while solving the problem have been researched and the schemes include a space-time block code (Double-STTD), a space-time BICM (STBICM), and the like.

In order to describe a communication method in the MIMO antenna system described above by a more detailed method, when the communication method is mathematically modeled, the mathematical modeling may be shown as below.

First, it is assumed that NT transmitting antennas and NR receiving antennas are present as illustrated in FIG. 5.

First, in respect to a transmission signal, when NT transmitting antennas are provided, since the maximum number of transmittable information is NT, NT may be expressed as a vector given below.

$$s = [s_1, s_2, \ldots, s_{N_T}]^T \qquad \text{[Equation 2]}$$

Meanwhile, transmission power may be different in the respective transmission information s1, s2, . . . , sNT and in this case, when the respective transmission power is P1, P2, . . . , PNT, the transmission information of which the transmission power is adjusted may be expressed as a vector given below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

Further, ŝ may be expressed as described below as a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Meanwhile, the information vector ŝ of which the transmission power is adjusted is multiplied by a weight matrix W to constitute NT transmission signals x1, x2, . . . , xNT which are actually transmitted. Herein, the weight matrix serves to appropriately distribute the transmission information to the respective antennas according to a transmission channel situation, and the like. The transmission signals x1, x2, . . . , xNT may be expressed as below by using a vector x.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Equation 5]}$$

$$W\hat{s} = WPs$$

Herein, wij represents a weight between the i-th transmitting antenna and j-th transmission information and W represents the weight as the matrix. The matrix W is called a weight matrix or a precoding matrix.

Meanwhile, the transmission signal x described above may be divided into transmission signals in a case using the spatial diversity and a case using the spatial multiplexing.

In the case using the spatial multiplexing, since different signals are multiplexed and sent, all elements of an information vector s have different values, while when the spatial diversity is used, since the same signal is sent through multiple channel paths, all of the elements of the information vector s have the same value.

Of course, a method mixing the spatial multiplexing and the spatial diversity may also be considered. That is, for example, a case may also be considered, which transmits the same signal by using the spatial diversity through three transmitting antennas and different signals are sent by the spatial multiplexing through residual transmitting antennas.

Next, when NR receiving antennas are provided, received signals y1, y2, . . . , yNR of the respective antennas are expressed as a vector y as described below.

$$y = [y_1, y_2, \ldots, y_{N_R}]^T \qquad \text{[Equation 6]}$$

Meanwhile, in the case of modeling the channel in the MIMO antenna communication system, respective channels may be distinguished according to transmitting and receiving antenna indexes and a channel passing through a receiving antenna i from a transmitting antenna j will be represented as hij. Herein, it is noted that in the case of the order of the index of hij, the receiving antenna index is earlier and the transmitting antenna index is later.

The multiple channels are gathered into one to be expressed even as vector and matrix forms. An example of expression of the vector will be described below.

FIG. 6 is a diagram illustrating a channel from multiple transmitting antennas to one receiving antenna.

As illustrated in FIG. 6, a channel which reaches receiving antenna I from a total of NT transmitting antennas may be expressed as below.

$$h_i^T = [h_{i1}, h_{i2}, \ldots, h_{iN_T}] \qquad \text{[Equation 7]}$$

Further, all of channels passing through NR receiving antennas from NT transmitting antennas may be shown as below through matrix expression shown in Equation 7 given above.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R 1} & h_{N_R 2} & \ldots & h_{N_R N_T} \end{bmatrix} \qquad \text{[Equation 8]}$$

Meanwhile, since additive white Gaussian noise (AWGN) is added after passing through a channel matrix H given above in an actual channel, white noises n1, n2, . . . , nNR added to NR receiving antennas, respectively are expressed as below.

$$n = [n_1, n_2, \ldots, n_{N_R}]^T \qquad \text{[Equation 9]}$$

Each of the transmission signal, the reception signal, the channel, and the white noise in the MIMO antenna communication system may be expressed through a relationship given below by modeling the transmission signal, the reception signal, the channel, and the white noise.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = $$

[Equation 10]

$$Hx + n$$

The numbers of rows and columns of the channel matrix H representing the state of the channel are determined by the numbers of transmitting and receiving antennas. In the case of the channel matrix H, the number of rows becomes equivalent to NR which is the number of receiving antennas and the number of columns becomes equivalent to NR which is the number of transmitting antennas. That is, the channel matrix H becomes an NR×NR matrix.

In general, a rank of the matrix is defined as the minimum number among the numbers of independent rows or columns Therefore, the rank of the matrix may not be larger than the number of rows or columns. As an equation type example, the rank (rank(H)) of the channel matrix H is limited as below.

$$rank(H) \leq \min(N_T, N_R)$$ [Equation 11]

Further, when the matrix is subjected to Eigen value decomposition, the rank may be defined as not 0 but the number of Eigen values among the Eigen values. By a similar method, when the rank is subjected to singular value decomposition, the rank may be defined as not 0 but the number of singular values. Accordingly, a physical meaning of the rank in the channel matrix may be the maximum number which may send different information in a given channel.

In the present specification, a 'rank' for MIMO transmission represents the number of paths to independently transmit the signal at a specific time and in a specific frequency resource and 'the number of layers' represents the number of signal streams transmitted through each path. In general, since the transmitter side transmits layers of the number corresponding to the number of ranks used for transmitting the signal, the rank has the same meaning as the number layers if not particularly mentioned.

What has been discussed above in connection with FIGS. 1 to 6 may be applied to clarify or specify the embodiments described below.

There are being served and commercialized mobile communication systems that utilize 5G new radio (NR) transmission schemes. For next-generation mobile communication systems, the number of communication devices and inter-device transmission/reception data will soar. Also expected is increasing communications with vehicles or drones or other aircrafts which move fast, beyond conventional infrastructure-UE communications. Such changes lead to demand for enhanced performance, such as high spectrum efficiency, high data rate, and per-unit area channel capacity. As high-frequency bands, including mmWave, are used for mobile communications, the antenna element may be implemented in a smaller size. Resultantly, there is ongoing vigorous research efforts to develop massive multiple-input multiple-output (MIMO) transmission technology that forms a beam using more antenna elements.

Conventionally in wide use are the uniform linear array (ULA) and the uniform rectangular array (URA) which is an expansion of the ULA, obtained by stacking up ULAs. However, the ULA and the URA have limitations in forming beams to receivers present in various positions in a 3D space and have difficulty in communication especially if it exists in the direction perpendicular to the ground or the traveling range increases. Therefore, the development of massive MIMO-based beamforming requires a 3-dimensional (3D) antenna array advanced from the conventional array architecture, and among 3D array architectures, a spherical array shape needs to be researched that allows for most stable omni-directional transmission.

Hereinafter, embodiments of the disclosure are described.

There are proposed a 3D antenna array structure capable of beamforming to any position in a space and a specific scheme for generating a beam using the same. Described are a scheme for constructing a spherical 3D array structure through geodesic subdivision based on a regular polyhedron and beamforming equations for the scheme.

Also proposed are equations for the repetitive nature of null point characteristics of a beam observed when the beam is formed using a 3D spherical antenna array, an algorithm for increasing the summated transmission rate by minimizing inter-beam interference upon multi-beam transmission using the equations, and a codebook appropriate for multi-rank transmission.

Further, the embodiments and/or methods described in the disclosure are differentiated solely for ease of description, and some components in any one method may be replaced, or combined with components of another method.

A configuration of a spherical antenna array using geodesic subdivision and a beamformer are described below in detail with reference to FIGS. 7 and 8.

A regular polyhedron may be geodesically subdivided, and antenna elements are placed on the vertices (or centers of faces), thereby configuring an array. In the case of an icosahedron, each face which is an equilateral triangle is subdivided into several equilateral triangles having the same size according to the subdivision number n.

When the length of the side of the existing icosahedron is 1, the length of the side of the subdivided equilateral triangle becomes 1/n. A geodesic polyhedron is created by moving the vertices of the equilateral triangles created by subdivision from the center of the regular polyhedron to the circumscribed sphere of the regular polyhedron. A spherical array is formed by placing antennas at the vertices of the so-created geodesic polyhedron. As the radius of the sphere changes, the interval between adjacent antennas on the array also changes proportionally.

FIG. 7 illustrates a shape of an antenna array when an icosahedron is geodesically subdivided according to an embodiment of the disclosure.

(a) of FIG. 7 to (d) of FIG. 7 show geodesic arrays generated using subdivision number n=1, 2, 3, and 4, respectively, on an icosahedron.

FIG. 8 is a view illustrating a transmission path of an antenna in relation to a 3D spherical coordinate system.

FIG. 8 illustrates the positions of antennas on a spherical array and the user's position using a spherical coordinate system. The center of the sphere is set to the origin O, the coordinates of the mth antenna are set to $A_m(r_m, \theta_m, \phi_m)$, and the coordinates of the user performing transmission/reception are set to $U(\rho, \Theta, \Phi)$. The parameters in parentheses indicating coordinates indicate the distance from the origin, the angle from the z-axis in the positive direction, and the angle from the x-axis in the positive direction.

Considering the path between the origin O and the user $U(\rho, \Theta, \Phi)$ in the spherical coordinate system and the path between the antenna $A_m(r_m, \theta_m, \phi_m)$ and the user $U(\rho, \Theta, \Phi)$, the difference in length $d_m$ between the two paths is determined. That is, the path length difference $d_m$ is obtained by subtracting the path length of the beam transmitted from the antenna origin O to the user from the path length of the beam transmitted from the antenna $A_m$ to the user. The spherical coordinates of the antenna are converted into rectangular coordinates as in Equation 12 below.

$$A_m = [r_m\cos\phi_m\sin\theta_m, r_m\sin\phi_m\sin\theta_m, r_m\cos\theta_m] \quad \text{[Equation 12]}$$

The path length difference $d_m$ is determined as in Equation 13.

$$d_m = -r_m[\sin\Theta\sin\theta_m\cos(\Phi - \phi_m) + \cos\Theta\cos\theta_m] \quad \text{[Equation 13]}$$

Due to the path difference, the phase value of the channel for each antenna element is changed by $2\pi d_m/\lambda$, where $\lambda$ is the wavelength value of the carrier frequency. If the beamforming component for compensating for the phase component of the m-th antenna is set to $v_m = \exp(-j2\pi d_m/\lambda)$, the beamforming vector for forming a beam towards the user for the array constituted of M antenna elements $A_0, A_{One}, \ldots, A_{M-1}$ is expressed as Equation 14 below.

$$v = [v_0, \ldots, v_{M-1}]^T$$

$$= \left[e^{-j2\pi\frac{d_0}{\lambda}}, \ldots, e^{-j2\pi\frac{d_{M-1}}{\lambda}}\right]^T$$

$$= \left[e^{j2\pi\frac{r_0}{\lambda}[\sin\Theta\sin\theta_0\cos(\Phi-\phi_0)+\cos\Theta\cos\theta_0]}, \ldots, e^{j2\pi\frac{r_{M-1}}{\lambda}[\sin\Theta\sin\theta_{M-1}\cos(\Phi-\phi_{M-1})+\cos\Theta\cos\theta_{M-1}]}\right]^T \quad \text{[Equation 14]}$$

If the antenna elements are located at the same distance from the origin, such as in a geodesic spherical array, the following relationship is established: $r_0 = r_{One} = \ldots = r_{M-One}$ $(=r)$.

Described below in detail are the null point characteristics of a spherical antenna array and a codebook for using the same, with reference to FIGS. 9 to 19.

When forming a beam using a geodesic spherical antenna array, the positions of the null points are repeated at regular intervals regardless of the target direction and are thus located on a concentric circle.

FIG. 9 is a view illustrating null point characteristics of an antenna array according to an embodiment of the disclosure. FIG. 9 illustrates the above-described characteristics, and shows the positions of null points having a very small antenna array gain.

Referring to FIG. 9, the positions of the null points constitute regular concentric shapes regardless of the beam formation direction. Concentric circles marked as 1st null, 2nd null, and 3rd null are sets of null points closest, second closest, and third closest to the target direction, respectively, and the average of the angles between the kth null points and the target direction is defined as $\Psi_k$. In other words, $\Psi_k$ means the average angle between the null points on the k-th concentric circle and the target direction. The positions of the null points of the icosahedron-based geodesic k-subdivision array were measured and summarized in Table 2 below.

TABLE 2

| n | $\Psi_1$ | $\Psi_2$ | $\Psi_3$ | $\Psi_4$ | $\Psi_5$ | $\Psi_6$ | $\Psi_7$ | $\Psi_8$ | $\Psi_9$ | $\Psi_{10}$ |
|---|---|---|---|---|---|---|---|---|---|---|
| 1 | 63.52 | 137.88 | | | | | | | | |
| 2 | 31.72 | 66.78 | 114.12 | 153.77 | | | | | | |
| 3 | 20.90 | 41.00 | 62.77 | 90.17 | 122.37 | 146.47 | 166.67 | | | |
| 4 | 14.62 | 29.40 | 44.52 | 60.76 | 78.75 | 100.46 | 120.17 | 134.66 | 149.38 | 167.33 |

In the array used for the measurement, the interval between adjacent antennas was set to a half wavelength. As may be seen in Table 2 above, $\Psi_k \approx k\Psi_1$.

For example, for a geodesic 4-subdivision array, the average angles of null point positions for the second, third, and fourth concentric circles, which are $\Psi_2$, $\Psi_3$, and $\Psi_4$ may be approximated to $\Psi_1$, $3\Psi_1$, and $4\Psi_1$, respectively. The standard deviations of the angles between the null points on the k-th concentric circle and the target direction are summarized in Table 3 below.

TABLE 3

| n | $\Psi_1$ | $\Psi_2$ | $\Psi_3$ | $\Psi_4$ | $\Psi_5$ | $\Psi_6$ | $\Psi_7$ | $\Psi_8$ | $\Psi_9$ | $\Psi_{10}$ |
|---|---|---|---|---|---|---|---|---|---|---|
| 1 | 1.58 | 13.59 | | | | | | | | |
| 2 | 0.60 | 1.97 | 8.98 | 10.78 | | | | | | |
| 3 | 0.35 | 1.15 | 1.80 | 5.44 | 6.79 | 7.02 | 4.49 | | | |
| 4 | 0.30 | 0.74 | 1.14 | 1.56 | 2.11 | 4.00 | 5.33 | 2.98 | 5.74 | 4.91 |

For the null points which meet $\Psi_k < 90°$, the standard deviation of the angle is about 2° or less, indicating that the angle values are very concentrated in the average.

Specific comparison between a beamforming gain of a geodesic array, according to an embodiment, and a beamforming gain of a uniform linear array is described below with reference to FIGS. 10 and 11.

FIG. 10 is a view illustrating comparison between an antenna element arrangement of a geodesic 3-subdivision array antenna and an antenna element arrangement of a uniform linear array according to an embodiment of the disclosure.

(a) of FIG. 10 shows an arrangement of antenna elements in a geodesic 3-subdivision array, and (b) of FIG. 10 shows an arrangement of antenna elements in a uniform linear array.

FIG. 11 illustrates graphs of a beam shape of a geodesic 3-subdivision array and a beam shape of a uniform linear array based on changes in zenith angle according to an embodiment of the disclosure.

(a) of FIG. 11 shows a beam shape according to the geodesic 3-subdivision array of (a) of FIG. 10, and (b) of FIG. 11 shows a beam shape according to the uniform linear array of (b) of FIG. 10.

Referring to (a) of FIG. 11, the geodesic array makes no or little difference in beamforming gain shape when the zenith angle between a reference direction and the beamforming target direction meets $\Theta_{BF}=0°$ and 30°.

Referring to (b) of FIG. 11, in the uniform linear array, the beam shape changes according to changes in beam direction (i.e., changes in zenith angle), so that the relative positions of the null points are changed.

To inspect the characteristics related to the positions of the null points for a wider range of beamforming target directions, the angles of the first and second null points were observed while changing $\Theta_{BF}$ from 0° to 60°, and the corresponding values were shown in FIG. 12.

FIG. 12 illustrates graphs of the positions of null points of a geodesic 3-subdivision array and the positions of null points of a uniform linear array based on changes in zenith angle according to an embodiment of the disclosure.

(a) of FIG. 12 illustrates the positions of the null points of the geodesic 3-subdivision array, and (b) of FIG. 12 illustrates the positions of the null points of the uniform linear array.

Referring to (a) of FIG. 12, the geodesic array makes no or little difference in the position of the null point depending on the changes in beam direction ($\Theta_{BF}$). Referring to (b) of FIG. 12, the linear array makes a significant difference in the relative position of the null point when the beam direction ($\Theta_{BF}$If) is changed.

As described above, the spherical array proposed in the disclosure has a characteristic that the beam shape is kept constant regardless of the beam target direction. Accordingly, when beamforming is performed in an arbitrary direction in a 3D space, signals of a constant quality may be transmitted. It is also possible to perform multi-beam transmission with reduced mutual interference using the characteristic that the spherical array has constant null point positions.

FIG. 13 illustrates the beam shapes of a geodesic 3-subdivision array when the azimuth, which is the angle between the beam direction and the positive x-axis direction, meets $\Phi_{BF}=0°$, 60°, and 120°.

FIG. 13 is a view illustrating an example beam pattern of a geodesic antenna array according to an embodiment of the disclosure.

Referring to FIG. 13, the geodesic antenna array has similar beam shape characteristics regardless of changes in azimuth ($\Phi_{BF}$). Such beam shape characteristics of the spherical array may be utilized in designing an efficient codebook.

Matters related to a codebook utilizing the beam shape characteristics of the spherical array are described below.

When performing beamforming using a geodesic array, a codebook may be configured using the characteristic that the angle between the null point direction and the target direction remains constant as $\Psi_k \approx k\Psi_1$ regardless of the beam target direction.

Mutual interference may be minimized by setting the angle between code vectors constituting the codebook to be an integer multiple of $\Psi_1$. In other words, in light of the spherical coordinate system, the code vectors of the codebook may be set to be positioned at predetermined intervals (azimuth) on each concentric circle formed by the null points according to the null point position characteristics of the spherical array. FIG. 14 illustrates the respective positions of the code vectors indicated as dots on a plane.

FIG. 14 is a view illustrating selecting positions of code vectors in relation to a codebook configuration for an antenna array according to an embodiment of the disclosure.

Referring to FIG. 14, the center point represents the position of a reference code vector, and hexagons surrounding the center point correspond to concentric circles where null points exist. By placing 6 code vectors on the first hexagon closest to the reference code vector, 12 code vectors on the second hexagon, and 18 code vectors on the third hexagon, three adjacent code vectors may be made to constitute 3 vertices of an equilateral triangle.

The hexagons are referred to as the 1st, 2nd, and 3rd tiers, respectively, and the 1-th code vector of the k-th tier is denoted as $v_{k,l}$ in the drawings. In FIG. 14, there are a total of 1+6+12+18=37 code vectors, and more code vectors may be selected by using some of them or increasing the tiers. Since the shapes present on the spherical surface are shown as the triangles on a plane as shown in FIG. 14, they are not indeed equilateral triangles on the spherical surface. However, one side corresponds to an angular difference of about $\Psi_1$, and thus, the correlation between adjacent code vectors is low.

For tier indices k=0, 1, 2, 3 . . . and in-tier code vector indices l=1, 2, . . . , 6 k, the position of each code vector $v_{k,l}$ may be represented with zenith angle $\Theta_{k,l}$ azimuth angle $\Phi_{k,l}$ in the spherical coordinate system as shown in Equation 15 below.

$$\Theta_{k,l}=k\Psi_1$$

$$\Phi_{k,l}=2\pi l/6k \quad \text{[Equation 15]}$$

Here $\Psi_1$ uses the average value of the first zero positions presented in Table 1. When the sets of code vectors for each tier are denoted as $V_0=\{v_{0,1}\}$, $V_{One}=\{v_{1,1}, v_{1,2}, \ldots, v_{1,6}\}$, $V_2=\{v_{2,1}, v_{2,2}, \ldots, v_{2,12}\}$, and $V_3=\{v_{3,1}, v_{3,2}, \ldots, v_{3,18}\}$, the codebook V constituted of the code vectors existing in the three tiers illustrated in FIG. 14 may be defined as in Equation 16 below.

$$V=V_0 \cup V_1 \cup V_2 \cup V_3 \quad \text{[Equation 16]}$$

The positions of code vectors related to an antenna array are described below in detail with reference to FIGS. 15 and 16.

FIG. 15 is a view illustrating the positions of code vectors in relation to a codebook configuration of a geodesic 3-subdivision antenna array according to an embodiment of the disclosure. FIG. 15 illustrates the positions of the code vectors described in connection with FIG. 14, on flat concentric circles for each tier.

FIG. 16 is a view illustrating displaying the positions of code vectors constituting a codebook on a geodesic 3-subdivision antenna array according to an embodiment of the disclosure.

FIG. 16 illustrates the code vectors of FIG. 15 on a three-dimensional spherical surface. Referring to FIG. 16, the concentric circle by null points on the three-dimensional spherical surface corresponds to the tier (k) of the codebook. The code vectors belonging to the same tier (concentric circle) have the same zenith angle ($\Theta_{k,l}$). The zenith angle ($\Theta_{k,l}$) may be an integer multiple of the zenith angle $\Psi_1$ of the smallest one among the concentric circles.

FIGS. 15 and 16 show the positions of code vectors applied to the geodesic 3-subdivision array, and as $\Psi_1$, the value (20.9°) of Table 1 was used.

Hereinafter, the magnitude of interference depending on the position of the code vector is described with reference to FIG. 17.

FIG. 17 is a view illustrating inter-code vector interference in a codebook of a geodesic 3-subdivision array according to an embodiment of the disclosure.

The numbers marked in FIG. 17 represent the magnitude of interference between adjacent code vectors in dB. If the symmetry of the code vector positions is utilized, the interference values between all the adjacent code vectors may be determined using the marked interference magnitudes.

In FIG. 17, the interference between the reference code vector positioned in the zeroth tier which is the center and the adjacent code vector positioned in the first tier is small, e.g., −35 dB or less. More specific values of inter-code vector interference are summarized in Tables 4 and 5 below.

TABLE 4

|   | $1^{st}$ | $2^{nd}$ | $3^{rd}$ | avg. |
| --- | --- | --- | --- | --- |
| 0 | −56.73 | −36.32 | −39.30 | −44.12 |
| 1 | −34.82 | −22.14 | −23.52 | −26.83 |
| 2 | −22.28 | −23.94 | −22.16 | −22.80 |
| 3 | −17.29 | −18.88 | −25.74 | −20.64 |
| avg. | −32.78 | −25.32 | −27.68 | −28.59 |

TABLE 5

|   | $1^{st}$ | $2^{nd}$ | $3^{rd}$ | max |
| --- | --- | --- | --- | --- |
| 0 | −52.77 | −26.36 | −28.05 | −26.36 |
| 1 | −15.58 | −15.60 | −16.43 | −15.58 |
| 2 | −13.35 | −14.27 | −17.57 | −13.35 |
| 3 | −13.35 | −14.33 | −17.19 | −13.35 |
| max | −13.35 | −14.27 | −16.43 | −13.35 |

Table 4 summarizes the average interference values, and Table 5 summarizes the values related to the maximum interference value.

In Table 4, the numbers 0, 1, 2, and 3 in the first column mean that the interference values have been calculated based on the code vectors located in tiers 0, 1, 2, and 3, respectively, and the table sets forth average mutual interference when the distance from the corresponding code vector is 1, 2, and 3.

The maximum value of mutual interference is as illustrated in Table 5 above. As may be seen from Table 5, the code vectors present in the codebook according to an embodiment of the disclosure have a small magnitude of mutual interference. Therefore, stable multi-rank transmission is possible using these code vectors.

A plan view and a three-dimensional stereoscopic view for code vector positions applied to a geodesic 4-subdivision array are illustrated in FIGS. 18 and 19, respectively. As $\Psi_1$, the value (14.6°) of Table 1 was used. The magnitude of interference between adjacent code vectors in the codebook configured as described above is illustrated in FIG. 20, and specific interference values for each tier are summarized in Tables 6 and 7 below.

TABLE 6

|   | $1^{st}$ | $2^{nd}$ | $3^{rd}$ | avg. |
| --- | --- | --- | --- | --- |
| 0 | −69.23 | −40.11 | −42.64 | −50.66 |
| 1 | −40.95 | −23.68 | −24.24 | −29.62 |
| 2 | −29.70 | −24.90 | −22.19 | −25.60 |
| 3 | −25.26 | −23.83 | −26.64 | −25.24 |
| avg. | −41.29 | −28.13 | −28.93 | −32.78 |

TABLE 7

|   | $1^{st}$ | $2^{nd}$ | $3^{rd}$ | max |
| --- | --- | --- | --- | --- |
| 0 | −64.20 | −30.76 | −28.66 | −28.66 |
| 1 | −15.33 | −16.51 | −16.80 | −15.33 |

TABLE 7-continued

|  | $1^{st}$ | $2^{nd}$ | $3^{rd}$ | max |
|---|---|---|---|---|
| 2 | −13.33 | −14.15 | −18.07 | −13.33 |
| 3 | −13.33 | −14.15 | −20.63 | −13.33 |
| max | −13.33 | −14.15 | −16.80 | −13.33 |

Table 6 summarizes the average interference values, and Table 7 summarizes the values related to the maximum interference value.

An algorithm for transmitting multiple beams using the null point characteristics is described below in detail.

To simultaneously perform data transmission to a plurality of users (i.e., a plurality of UEs) located in an arbitrary place in a three-dimensional space, a multi-beam transmission algorithm may be applied, rather than using the code vectors in the codebook.

When K UEs are present in positions whose zenith angle and azimuth angle are denoted as $(\Theta_1, \Phi_1), (\Theta_2, \Phi_2), \ldots, (\Theta_K, \Phi_K)$, the algorithm according to the present embodiment aims to reduce interference and maximize the summated transmission rate by generating a beam adjusted to a changed angle instead of performing accurate beamforming towards each UE.

When the signal-to-interference plus noise ratio (SINK) of the k-th UE is denoted as $\Gamma_k$, the transmission rate is $R_k = \log_2(1+\Gamma_k)$, and the summated transmission rate for K UEs may be defined as in Equation 17 below.

$$R = \sum_k R_k = \sum_k \log_2(1+\Gamma_k) = \sum_k \log_2\left(1 + \frac{P_k}{\sum_{j \neq k} I_{kj} + \sigma^2}\right) \quad \text{[Equation 17]}$$

Here $P_k$ is the received signal power of the beam for the k-th UE, $I_{kj}$ is the power of interference with the k-th UE by the beam for the jth beam, and $\sigma^2$ denotes the noise power. If the noise power is sufficiently small as compared to the interference power, the summated transmission rate may be denoted as $R = \sum_k \log_2(1+P_k/\sum_{j \neq k} I_{kj})$. Assuming that the signal-to-interference ratio obtained through beam adjustment is greater than 0 dB, the summated transmission rate may be defined as in Equation 18 below from the condition $P_k/\sum_{j \neq k} I_{kj} \gg 1$.

$$R \approx \sum_k \log_2\left(\frac{P_k}{\sum_{j \neq k} I_{kj}}\right) = \log_2 \prod_k \frac{P_k}{\sum_{j \neq k} I_{kj}} \quad \text{[Equation 18]}$$

Equation 18 above may be used as an approximated objective function to maximize the summated transmission rate. An example multi-user beam adjustment algorithm for maximizing the summated transmission rate by utilizing the null point characteristics of the spherical array may be performed according to steps 1 to 5 below.

Step 1: The base station generates null point concentric circles around the direction of the kth user positioned at $(\Theta_k, \Phi_k)$ and repeats the same for all the user indexes k=1, 2, ..., K.

Step 2: The base station selects the crossings between the generated concentric circles as positions of candidate beams.

Step 3: To transmit a beam to the kth user, the base station selects the position of the candidate beam closest to the direction $(\Theta_k, \Phi_k)$ and repeats the same for all the UE indexes k=1, 2, ..., K. After the beam directions are determined for all the users, the base station calculates the summated transmission rate.

Step 4: The base station moves the position of the beam in a direction in which the summated transmission rate increases while sequentially changing the position of the candidate beam for each user. In this case, the order of moving the position of the beam may be determined in an appropriate manner according to the total number of users.

Step 5: If the summated transmission rate does not increase any more, the base station finally determines the positions of the multiple beams and performs transmission.

Matters related to evaluation of performance according to the multi-beam transmission algorithm are described below with reference to FIGS. 21 to 26.

Using a geodesic spherical array, the multi-user beam adjustment algorithm was applied and the performance was evaluated for the cases of K=2 and K=3. As each antenna element present on the array, an isotropic element having the same gain in all directions was considered.

FIG. 21 is a view illustrating a method for transmitting beams to a plurality of UEs using an antenna array according to an embodiment of the disclosure.

In FIG. 21, two users present in arbitrary positions in a 3D space are denoted as UE 1 and UE 2, and when the positions of the users are $(\Theta_1, \Phi_1)$ and $(\Theta_2, \Phi_2)$, the angle between the users may be defined as in Equation 19 below.

$$\psi = 2\sin^{-1}\frac{\sqrt{2\frac{(1-\sin\Theta_1\sin\Theta_2\cos(\Phi_1-\Phi_2)-}{\cos\Theta_1\cos\Theta_2)}}}{2} \quad \text{[Equation 19]}$$

The angle between the beam transmission direction and the other user's position is adjusted to the null point angle via the beam adjustment algorithm, and among the null point positions $\Psi_1, \Psi_2, \Psi_2, \Psi_4, \ldots$ presented in Table 1 above, the value closest to $\psi$ is selected.

By the beam direction adjustment, UE 2 is present in the null point position of the UE 1 beam, and UE 1 is present in the null point position of the UE 2 beam. This is illustrated in FIG. 22.

FIG. 22 is a view illustrating positions of null points in relation to a summated transmission rate when transmitting beams to a plurality of UEs using an antenna array according to an embodiment of the disclosure.

Referring to FIG. 22, the beam gain pattern (Individual) shown in dashed lines represents the case where the beam gain is maximized in the user's position, and the beam gain pattern (Proposed) shown in solid line represents the case where the summated transmission rate is increased by minimizing interference via beam adjustment. FIG. 23 illustrates the performance gain of the summated transmission rate increased via such adjustment.

FIG. 23 is a graph illustrating an increase rate of a summated transmission rate when an algorithm for increasing the summated transmission rate is applied based on two UEs according to an embodiment of the disclosure.

Referring to FIG. 23, it may be observed that although the gain differs depending on the geodesic subdivision numbers, a gain is obtained that is 50% to 100% higher than before adjustment In the case of three users (three UEs), null point concentric circles may be set around the position of each UE and the crossings may be determined. This is illustrated in FIGS. 24 to 25.

FIG. 24 is a view illustrating adjustment of beam positions for each UE in relation to an algorithm for increasing the summated transmission rate according to an embodiment of the disclosure.

Referring to FIG. 24, the base station may set null point concentric circles around each of the three UEs. The null point concentric circle means a concentric circle generated according to the null point position characteristics of the spherical array. In FIG. 24, it is assumed that the base station generates two null point concentric circles around each UE.

(a) of FIG. 24 illustrates candidate beams of UE 1, (b) of FIG. 24 illustrates candidate beams of UE 2, and (c) of FIG. 24 illustrates candidate beams of UE 3.

It is described below with reference to (a) of FIG. 24. In (a) of FIG. 24, the crossings of concentric circles set for each of UE 2 and UE 3 become the positions of candidate beams of UE 1. Among the four candidate beams (marked X), the beam closest to UE 1 is selected.

The candidate beams of UE 2 and UE 3 are selected in the same manner for (b) of FIG. 24 and (c) of FIG. 24.

FIG. 25 is a view illustrating the results of adjustment of beam positions for each UE to increase the summated transmission rate according to an embodiment of the disclosure.

FIG. 25 shows candidate beams selected for UE 1 to UE 3 in (a) of FIG. 24 to (c) of FIG. 24 in a single drawing. The so-determined beams are not oriented in the directions exactly coincident with the respective positions of the plurality of UEs, but the summated transmission rate for all of the plurality of UEs is maximized.

Specifically, since the beam for any one UE is directed to the position where the null points of the remaining UEs cross, interference between the respective beams of the UEs is minimized Therefore, the summated transmission rate for all of the plurality of UEs may be maximized.

FIG. 26 illustrates the rate improvement of the summated transmission rate generated via the above adjustment process.

FIG. 26 is a graph illustrating an increase rate of a summated transmission rate when an algorithm for increasing the summated transmission rate is applied based on three UEs according to an embodiment of the disclosure.

Referring to FIG. 26, for three UEs, although the gain differs depending on the geodesic subdivision numbers (n), a gain is obtained that is 30% to 100% higher than before adjustment.

Accordingly, it is possible to perform efficient beamforming for various types of transceivers present in a three-dimensional space using a spherical antenna array proposed in the disclosure. Further, multi-rank transmission with reduced inter-beam interference may be performed using a codebook as proposed in the disclosure, and the utility of the spherical antenna array may be increased by applying an algorithm that maximizes the summated transmission rate for multiple users in arbitrary positions.

A method for transmitting a signal by a base station based on an antenna array in a wireless communication system and a device therefor based on the above-described embodiments are described below with reference to FIGS. 27 to 29.

Further, the embodiments and/or methods described in the disclosure are differentiated solely for ease of description, and some components in any one method may be replaced, or combined with components of another method.

FIG. 27 is a flowchart illustrating a method for transmitting signals by a base station based on an antenna array according to an embodiment of the disclosure.

Referring to FIG. 27, a method for transmitting a signal by a base station based on an antenna array according to an embodiment of the disclosure includes determining a multi-rank beam (S2710) and transmitting a signal using the multi-rank beam (S2720).

The base station may determine a multi-rank beam for simultaneously transmitting signals to a plurality of UEs, and transmit signals to the plurality of UEs using the multi-rank beam. This is described below in detail.

In S2710, the base station determines a multi-rank beam based on (i) positions of a plurality of user equipment (UEs) and (ii) positions of null points of a beam generated via the antenna array.

According to an embodiment, the antenna array may be based on a three-dimensional shape having omnidirectional symmetry.

The omnidirectional symmetry means that the shape (e.g., a pentagon) when viewed from one direction (e.g., a pentagon) is identical to the shape when viewed from another direction (the opposite direction), and the same characteristic applies in any direction.

Taking an icosahedron as an example, the shape when viewed from one direction is a pentagon, and the shape viewed from the opposite direction is also a pentagon. The icosahedron is shown as a pentagon whatever direction it is viewed in, and thus has omnidirectional symmetry.

Other example three-dimensional shapes having omnidirectional symmetry may include a sphere, a dodecahedron, or a geodesically subdivided regular polyhedron. However, without limitations thereto, the three-dimensional shape having omnidirectional symmetry may be any 3D shape that is shown as having the same shape (e.g., circle, pentagon, or triangle) whatever direction it is viewed in.

Due to the shape as described above, the null points of the beam generated through the antenna array are formed in constant positions with respect to the direction of the beam. The null point means a position where the gain of the antenna array beam is very low.

The multi-rank beam may be determined by a specific codebook or may be determined from the crossings of the concentric circles generated by the null points. Details are given below in connection with FIGS. 28 and 29.

According to an embodiment, the positions of the null points and the positions of the plurality of UEs may be set based on a polar coordinate system having a center of the antenna array as an origin thereof.

The operation of determining the multi-rank beam based on (i) the positions of the plurality of UEs (100/200 of FIGS. 30 to 35) and (ii) the positions of the null points of the beam generated via the antenna array by the base station (100/200 of FIGS. 30 to 35) according to S2710 described above may be implemented by the device of FIGS. 30 to 35.

For example, referring to FIG. 31, one or more processors 202 may control one or more transceivers 206 and/or one or more memories 204 to determine a multi-rank beam based on (i) the positions of the plurality of UEs 100 and (ii) the positions of the null points of the beam generated via the antenna array.

In S2720, the base station transmits signal to the plurality of UEs using the multi-rank beam.

The operation of transmitting signals to the plurality of UEs (100/200 of FIGS. 30 to 35) using the multi-rank beam by the base station (100/200 of FIGS. 30 to 35) according to S2720 described above may be implemented by the device of FIGS. 30 to 35.

For example, referring to FIG. 35, the controller 220 may control the communication unit 210 and/or the memory 230 to transmit signals to a plurality of unmanned aerial vehicles (UAVs) 100 using the multi-rank beam.

A method for using a codebook in connection with determination of a multi-rank beam is described below in detail with reference to FIG. 28.

FIG. 28 is a flowchart illustrating an example of specifying the step of determining a multi-rank beam in a method for transmitting a signal by a base station based on an antenna array according to an embodiment of the disclosure.

Referring to FIG. 28, the step S2710 of determining a multi-rank beam according to an embodiment of the disclosure may include the step S2810 of generating a codebook and the step S2820 of determining a multi-rank beam based on the codebook and positions of a plurality of UEs.

In S2810, the base station generates a codebook related to the multi-rank beam.

According to an embodiment, the codebook may include a plurality of code vectors. The respective positions of the plurality of code vectors may be determined based on the positions of the null points.

According to an embodiment, the plurality of code vectors may be classified into a plurality of tiers, and zenith angles according to positions of code vectors included in the same tier are the same.

According to an embodiment, a zenith angle according to a position of a code vector included in any one of the plurality of tiers may be an integer multiple of a specific zenith angle ($\Psi_1$).

According to an embodiment, the null points are positioned on concentric circles that are centered on a direction of the beam formed by the antenna array and repeated at predetermined intervals. The specific zenith angle ($\Psi_1$) may be an average of zenith angles according to positions of specific null points, and the specific null points may be null points positioned on a concentric circle closest to the beam formed by the antenna array among the null points.

This is described in detail below in connection with the above-described embodiments.

Due to the three-dimensional shape (e.g., a sphere) having omnidirectional symmetry of the antenna array, the null points of the beam are formed in certain positions with respect to the direction of the beam.

Specifically, it is assumed that the three-dimensional shape of the antenna array is a sphere. The null points are positioned on concentric circles centered on the direction of the beam. The null points form concentric circles centered on the direction of the beam no matter which direction the beam is formed.

In this case, the average of the angles between the direction of the beam and the concentric circles may be defined as $\Psi_k$. $\Psi_k$ means the average angle between the null points on the k-th concentric circle and the direction of the beam. $\Psi_k$ corresponds to the zenith angle according to the position of the null point in the spherical coordinate system with the center of the antenna array as the origin.

According to the positional characteristic in which the null points are formed, the zenith angle ($\Psi_k$) according to the position of the null point is an integer (k) multiple of the zenith angle ($\Psi_1$) of the null point positioned on the concentric circle closest to the beam among the concentric circles. In other words, the zenith angle ($\Psi_k$) according to the position of the null point meets: $\Psi_k \approx k\Psi_1$.

To utilize the positional characteristics of the null points as described above, the code vectors included in the codebook may be set to be positioned at predetermined intervals (azimuth angle) on the concentric circles formed by the null points.

Accordingly, the plurality of tiers may correspond to the concentric circles of null points generated around the direction of the beam formed by the antenna array. In this regard, the zenith angle ($\Psi_k$) according to the code vector included in any one tier (k) among the plurality of tiers is an integer multiple of a specific zenith angle ($\Psi_1$).

The operation of generating the codebook related to the multi-rank beam by the base station (100/200 of FIGS. 30 to 35) according to S2810 described above may be implemented by the device of FIGS. 30 to 35.

For example, referring to FIG. 31, one or more processors 202 may control one or more memories 204 to generate a codebook related to the multi-rank beam.

In S2820, the base station determines the multi-rank beam based on the codebook and the positions of the plurality of UEs.

Specifically, the base station may determine the multi-rank beam by selecting code vectors adjacent to the respective positions of the plurality of UEs in the codebook.

The operation of determining the multi-rank beam based on the codebook and the positions of the plurality of UEs (100/200 of FIGS. 30 to 35) by the base station (100/200 of FIGS. 30 to 35) according to S2820 described above may be implemented by the device of FIGS. 30 to 35.

For example, referring to FIG. 35, the controller 220 may control the communication unit 210 and/or the memory 230 to determine the multi-rank beam based on the codebook and the positions of the plurality of unmanned aerial vehicles (UAVs) 100.

FIG. 29 is a flowchart illustrating another example of specifying the step of determining a multi-rank beam in a method for transmitting a signal by a base station based on an antenna array according to an embodiment of the disclosure.

Referring to FIG. 29, the step S2710 of determining the multi-rank beam according to an embodiment of the disclosure includes the step S2910 of obtaining positions of null points, the step S2920 of determining positions of candidate beams, and the step S2930 of determining a multi-rank beam.

In S2910, the base station obtains positions of null points formed by beams of the antenna array individually directed to the plurality of UEs. The null points form concentric circles repeated at regular intervals on the surface of the sphere having the center of the antenna array as the origin.

The operation of obtaining the positions of the null points formed by the beams of the antenna array, individually directed to the plurality of UEs (100/200 of FIGS. 30 to 35) by the base station (100/200 of FIGS. 30 to 35) according to S2910 described above may be implemented by the device of FIGS. 30 to 35.

For example, referring to FIG. 35, the controller 220 may control the communication unit 210 and/or the memory 230 to obtain the positions of the null points formed by the beams of the antenna array individually directed to the plurality of unmanned aerial vehicles (UAVs) 100.

In S2920, the base station determines the crossings of the concentric circles as positions of candidate beams.

The operation of determining the crossings of the concentric circles as the positions of the candidate beams by the base station (100/200 of FIGS. 30 to 35) according to S2920 described above may be implemented by the device of FIGS. 30 to 35.

For example, referring to FIG. 31, one or more processors 202 may control one or more memories 204 to determine the crossings of the concentric circles as the positions of the candidate beams.

In S2930, the base station determines candidate beams selected according to a preset requirement among the candidate beams as the multi-rank beam.

According to an embodiment, the candidate beams selected according to the preset requirement may be candidate beams closest to the respective positions of the plurality of UEs.

According to an embodiment, positions of the candidate beams closest to the respective positions of the plurality of UEs may be adjusted so that a summated transmission rate by the multi-rank beam is maximized.

According to an embodiment, the summated transmission rate is calculated by the following equation:

$$R = \log_2 \prod_k \frac{P_k}{\sum_{j \neq k} I_{kj}} \qquad \text{(Equation)}$$

wherein R is the summated transmission rate, k is 1≤k≤K, K is a number of the plurality of UEs, j meets 1≤j≤K and j≠k, $P_k$ is received signal power of a candidate beam of a k-th UE among the plurality of UEs, and $I_{kj}$ is interference power given to the k-th UE by a candidate beam for a j-th UE among the plurality of UEs.

The operation of determining the candidate beams selected according to the preset requirement from among the candidate beams as the multi-rank beam by the base station (100/200 of FIGS. 30 to 35) according to S2930 described above may be implemented by the device of FIGS. 30 to 35.

For example, referring to FIG. 31, one or more processors 202 may control one or more transceivers 206 and/or one or more memories 204 to determine the candidate beams selected according to the preset condition from among the candidate beams as the multi-rank beam.

Example of Wireless Communication System Applied to the Disclosure

The various descriptions, functions, procedures, proposals, methods, and/or operational flowcharts of the disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 30 illustrates a communication system 1 applied to the disclosure.

Referring to FIG. 30, a communication system 1 applied to the disclosure includes wireless devices, Base Stations (BS s), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the disclosure.

Example of Wireless Device Applied to the Disclosure

FIG. 31 illustrates wireless devices applicable to the disclosure.

Referring to FIG. 31, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 30.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Disclosure

FIG. 32 illustrates a signal process circuit for a transmission signal.

Referring to FIG. 32, a signal processing circuit 1000 may include scramblers 1010, modulators 1020, a layer mapper 1030, a precoder 1040, resource mappers 1050, and signal generators 1060. An operation/function of FIG. 32 may be performed, without being limited to, the processors 102 and 202 and/or the transceivers 106 and 206 of FIG. 31. Hardware elements of FIG. 32 may be implemented by the processors 102 and 202 and/or the transceivers 106 and 206 of FIG. 31. For example, blocks 1010 to 1060 may be implemented by the processors 102 and 202 of FIG. 31. Alternatively, the blocks 1010 to 1050 may be implemented by the processors 102 and 202 of FIG. 31 and the block 1060 may be implemented by the transceivers 106 and 206 of FIG. 31.

Codewords may be converted into radio signals via the signal processing circuit 1000 of FIG. 32. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 32. For example, the wireless devices (e.g., 100 and 200 of FIG. 31) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Disclosure

FIG. 33 illustrates another example of a wireless device applied to the disclosure.

The wireless device may be implemented in various forms according to a use-case/service (refer to FIG. 30). Referring to FIG. 33, wireless devices 100 and 200 may correspond to the wireless devices 100 and 200 of FIG. 31 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 31. For example, the transceiver(s) 114 may include the one or more transceivers 106 and 206 and/or the one or more antennas 108 and 208 of FIG. 31. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 30), the vehicles (100b-1 and 100b-2 of FIG. 30), the XR device (100c of FIG. 30), the hand-held device (100d of FIG. 30), the home appliance (100e of FIG. 30), the IoT device (100f of FIG. 30), a digital broadcast terminal, a hologram device, a public safety device, an MTC device, a medicine device, a fintech device (or a finance device), a security device, a climate/environment device, the AI server/device (400 of FIG. 30), the BSs (200 of FIG. 30), a network node, etc. The wireless device may be used in a mobile or fixed place according to a use-example/service.

In FIG. 33, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Disclosure

FIG. 34 illustrates a hand-held device applied to the disclosure.

The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 34, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 33, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Example of Vehicle or Autonomous Driving Vehicle Applied to the Disclosure

FIG. 35 illustrates a vehicle or an autonomous driving vehicle applied to the disclosure.

The vehicle or autonomous driving vehicle may be implemented by a mobile robot, a car, a train, a manned/unmanned Aerial Vehicle (AV), a ship, etc.

Referring to FIG. 35, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 33, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information on a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

According to an embodiment of the disclosure, a method for transmitting a signal by a base station based on an antenna array in a wireless communication system and a device therefor provide the following effects.

According to an embodiment of the disclosure, a base station determines a multi-rank beam based on the positions of null points of a beam generated via an antenna array and the positions of a plurality of UEs and transmits signals to the plurality of beams using the multi-rank beam. The antenna array has a three-dimensional shape with omnidirectional symmetry. The shape allows the null points of a beam generated by the antenna array to have constant positions. Therefore, the disclosure may minimize inter-beam interference for each UE when simultaneously transmitting signals to the plurality of UEs.

Further, according to an embodiment of the disclosure, the multi-rank beam is determined based on the positions of the plurality of UEs and a codebook generated considering the positional characteristics of the null points according to the shape of the antenna array. The positions of the code vectors included in the codebook are determined based on the positions of the null points. Therefore, if a beam is formed based on any one code vector, the positions of the remaining code vectors coincide with the positions of the null points of the formed beam. Accordingly, the disclosure may determine a multi-rank beam in which inter-beam interference is minimized through the codebook.

Further, according to an embodiment of the disclosure, the base station obtains the positions of the null points by the beam for each of the plurality of UEs, and determines the crossings of the concentric circles formed by the null points as the positions of candidate beams. The base station determines the candidate beam closest to the position of each of the plurality of UEs among the candidate beams as the multi-rank beam, and adjusts the position of each candidate beam selected so that the summated transmission rate is maximized. Accordingly, the disclosure may determine a multi-rank beam to maximize the summated transmission rate for the plurality of UEs, thus enhancing the efficiency of multi-rank transmission.

The embodiments of the disclosure described hereinbelow are combinations of elements and features of the disclosure. The elements or features may be considered selective unless otherwise mentioned. Each element or feature may be practiced without being combined with other elements or features. Further, an embodiment of the disclosure may be constructed by combining parts of the elements and/or features. Operation orders described in embodiments of the disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the disclosure or included as a new claim by subsequent amendment after the application is filed.

The embodiments of the disclosure may be achieved by various means, for example, hardware, firmware, software, or a combination thereof. In a hardware configuration, the methods according to the embodiments of the disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the disclosure may be implemented in the form of a module, a procedure, a function, etc. For example, software code may be stored in a memory unit and executed by a processor. The memories may be located at the interior or exterior of the processors and may transmit data to and receive data from the processors via various known means.

Those skilled in the art will appreciate that the disclosure may be carried out in other specific ways than those set forth herein without departing from the spirit and essential characteristics of the disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The invention claimed is:

1. A method for transmitting a signal by a base station based on an antenna array in a wireless communication system, the method comprising:
determining a multi-rank beam based on (i) positions of a plurality of user equipment (UEs) and (ii) positions of null points of a beam generated via the antenna array; and
transmitting a signal to the plurality of UEs using the multi-rank beam, wherein
the antenna array is based on a three-dimensional shape having omnidirectional symmetry, and wherein
the positions of the null points and the positions of the plurality of UEs are set based on a polar coordinate system having a center of the antenna array as an origin thereof.

2. The method of claim 1, wherein
determining the multi-rank beam includes:
generating a codebook related to the multi-rank beam; and
determining the multi-rank beam based on the codebook and the positions of the plurality of UEs, wherein
the codebook includes a plurality of code vectors, and wherein
respective positions of the plurality of code vectors are determined based on the positions of the null points.

3. The method of claim 2, wherein
the plurality of code vectors are classified into a plurality of tiers, and wherein zenith angles according to positions of code vectors included in the same tier are the same.

4. The method of claim 3, wherein
a zenith angle according to a position of a code vector included in any one of the plurality of tiers is an integer multiple of a specific zenith angle ($\Psi_1$).

5. The method of claim 4, wherein
the null points are positioned on concentric circles that are centered on a direction of the beam formed by the antenna array and repeated at predetermined intervals, wherein
the specific zenith angle ($\Psi_1$) is an average of zenith angles according to positions of specific null points, and wherein
the specific null points are null points positioned on a concentric circle closest to the beam formed by the antenna array among the null points.

6. The method of claim 1, wherein
determining the multi-rank beam includes:
obtaining the positions of the null points formed by the beam of the antenna array toward each of the plurality of UEs, wherein the null points form concentric circles repeated at predetermined intervals on a surface of a sphere having a center of the antenna array as an origin thereof;
determining crossings of the concentric circles as positions of candidate beams; and
determining candidate beams selected according to a preset requirement among the candidate beams as the multi-rank beam.

7. The method of claim 6, wherein
the candidate beams selected according to the preset requirement are candidate beams closest to respective positions of the plurality of UEs.

8. The method of claim 7, wherein
positions of the candidate beams closest to the respective positions of the plurality of UEs are adjusted so that a summated transmission rate by the multi-rank beam is maximized.

9. The method of claim 8, wherein
the summated transmission rate is calculated by:

$$R = \log_2 \prod_k \frac{P_k}{\sum_{j \neq k} I_{kj}}$$

wherein R is the summated transmission rate, k is $1 \leq k \leq K$, K is a number of the plurality of UEs, j meets $1 \leq j \leq K$ and $j \neq k$, $P_k$ is received signal power of a candidate beam of a k-th UE among the plurality of UEs, and $I_{kj}$ is interference power given to the k-th UE by a candidate beam for a j-th UE among the plurality of UEs.

10. A base station transmitting a signal based on an antenna array in a wireless communication system, the base station comprising:
one or more transceivers;
one or more processors; and
one or more memories operably connectible to the one or more processors and storing instructions to, when executed by the one or more processors, perform operations, wherein
the operations include:
determining a multi-rank beam considering (i) positions of a plurality of user equipment (UEs) and (ii) positions of null points of a beam generated via the antenna array; and
transmitting a signal to the plurality of UEs using the multi-rank beam, wherein
the antenna array is based on a three-dimensional shape having omnidirectional symmetry, and wherein
the positions of the null points and the positions of the plurality of UEs are set based on a polar coordinate system having a center of the antenna array as an origin thereof.

11. The base station of claim 10, wherein
determining the multi-rank beam includes:
generating a codebook related to the multi-rank beam; and
determining the multi-rank beam based on the codebook and the positions of the plurality of UEs, wherein
the codebook includes a plurality of code vectors, and wherein
respective positions of the plurality of code vectors are determined based on the positions of the null points.

12. The base station of claim 11, wherein
the plurality of code vectors are classified into a plurality of tiers, and wherein zenith angles according to positions of code vectors included in the same tier are the same.

13. The base station of claim 12, wherein
a zenith angle according to a position of a code vector included in any one of the plurality of tiers is an integer multiple of a specific zenith angle ($\Psi_1$).

14. The base station of claim 13, wherein
the null points are positioned on concentric circles that are centered on a direction of the beam formed by the antenna array and repeated at predetermined intervals, wherein
the specific zenith angle ($\Psi_1$) is an average of zenith angles according to positions of specific null points, and wherein
the specific null points are null points positioned on a concentric circle closest to the beam formed by the antenna array among the null points.

15. The base station of claim 10, wherein
determining the multi-rank beam includes:
obtaining the positions of the null points formed by the beam of the antenna array toward each of the plurality of UEs, wherein the null points form concentric circles repeated at predetermined intervals on a surface of a sphere having a center of the antenna array as an origin thereof;
determining crossings of the concentric circles as positions of candidate beams; and
determining candidate beams selected according to a preset requirement among the candidate beams as the multi-rank beam.

\* \* \* \* \*